US010052961B2

(12) United States Patent
Hashimoto

(10) Patent No.: US 10,052,961 B2
(45) Date of Patent: Aug. 21, 2018

(54) BATTERY SYSTEM FOR ELECTRIC VEHICLE FOR LIMITING BATTERY DETERIORATION

(71) Applicant: TOYOTA JIDOSHA KABUSHIKI KAISHA, Toyota-shi, Aichi-ken (JP)

(72) Inventor: Hironobu Hashimoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/392,450

(22) Filed: Dec. 28, 2016

(65) Prior Publication Data

US 2017/0190258 A1 Jul. 6, 2017

(30) Foreign Application Priority Data

Jan. 6, 2016 (JP) .................................. 2016-001010

(51) Int. Cl.
*H02J 7/00* (2006.01)
*B60L 11/18* (2006.01)

(52) U.S. Cl.
CPC ....... *B60L 11/1811* (2013.01); *B60L 11/1857* (2013.01); *B60L 11/1862* (2013.01); *Y02T 10/7005* (2013.01)

(58) Field of Classification Search
CPC ............ G01R 31/3606; G01R 31/3679; B60L 11/1811; B60L 11/1857; B60L 11/1862; Y02T 10/7005

USPC ......................................................... 320/134
See application file for complete search history.

(56) References Cited

U.S. PATENT DOCUMENTS

| 2014/0225571 A1* | 8/2014 | Obata | H01M 10/44 320/136 |
| 2015/0338468 A1* | 11/2015 | Kaiya | H02J 7/00 324/432 |
| 2017/0151880 A1 | 6/2017 | Nakashima et al. | |

FOREIGN PATENT DOCUMENTS

| JP | 2014-003826 A | 1/2014 |
| JP | 2017-103080 A | 6/2017 |
| WO | 2013/046263 A1 | 4/2013 |

* cited by examiner

*Primary Examiner* — David V Henze-Gongola
(74) *Attorney, Agent, or Firm* — Sughrue Mion, PLLC

(57) ABSTRACT

A nonaqueous electrolyte secondary battery is a battery system for an electric vehicle which prevents high rate deterioration. An integrated evaluation value which is a deterioration index value of high rate deterioration is subjected to correction processing reflecting a recovery behavior of the high rate deterioration during charging/discharging deactivation in a battery deactivation period. The correction processing is executed according to a relaxation coefficient indicating the degree of relaxation of deviation of an ion concentration each time a given time elapses when the battery deactivation period ends. The relaxation coefficient is set variably such that, when a time length of the battery deactivation period is short, the degree of relaxation of deviation of the ion concentration for the given time becomes greater than that when the time length is long.

8 Claims, 12 Drawing Sheets

BATTERY SYSTEM FOR ELECTRIC VEHICLE FOR LIMITING BATTERY DETERIORATION

CROSS-REFERENCE TO RELATED APPLICATIONS

This application claims priority to Japanese Patent Application No. 2016-001010 filed on Jan. 6, 2016, the entire contents of which are hereby incorporated by reference.

BACKGROUND

1. Technical Field

The present disclosure relates to a battery system for an electric vehicle, and in particular, relates to a battery system including a nonaqueous secondary battery for a vehicle drive power supply.

2. Description of Related Art

A nonaqueous secondary battery having a nonaqueous electrolyte, which is represented by a lithium-ion secondary battery, is used for a vehicle drive power supply (on-vehicle power supply) of an electric vehicle, such as a hybrid car, an electric car, or a fuel battery car. As one factor for causing an increase in resistance of the nonaqueous secondary battery, a phenomenon in which high rate charging or discharging is continuously performed to cause an increase in resistance due to unevenness (deviation) of a salt concentration (ion concentration) in the electrolyte, so-called high rate deterioration, is known.

International Publication No. WO 2013/046263 describes that an integrated evaluation value ($\Sigma Dex(N)$) is determined as a deterioration index value by integrating an excess of a threshold for an evaluation value ($D(N)$) of deterioration due to deviation of an ion concentration in an electrolyte calculated based on a history of a current value when a battery is charged/discharged and correcting relaxation of deviation of the ion concentration with time. Then, control for reducing a discharge power upper limit of the secondary battery when the deterioration index value exceeds a threshold (positive).

Japanese Patent Application Publication No. 2014-3826 (JP 2014-3826 A) describes that a common integrated evaluation value based on the same evaluation value as in WO 2013/046263 is used as a deterioration index value, if the integrated evaluation value becomes greater than a positive threshold, it is determined to be over-discharged and the discharge power is restricted, and if the integrated evaluation value is smaller than a negative threshold, it is determined to be over-charged and the charge power is restricted.

WO 2013/046263 and JP 2014-3826 A describes that, in calculating the evaluation value ($D(N)$) of deterioration due to deviation of the ion concentration, calculation reflecting a decrease in deviation of the ion concentration with ion diffusion at each cycle time ($\Delta t$) is performed.

In addition, WO 2013/046263 describes that, if charging/discharging of the secondary battery is deactivated, an increase (that is, high rate deterioration) in resistance increase rate due to charging/discharging resumed after deactivation is suppressed. For this reason, WO 2013/046263 describes that calculation for multiplying the integrated evaluation value used as the deterioration index value by a correction coefficient a ($0<a<1$) is executed at each cycle time, thereby correcting the integrated evaluation value (deterioration index value) in consideration of relaxation of high rate deterioration.

However, in the techniques described in WO 2013/046263 and JP 2014-3826 A, it is determined whether or not there is a need for restricting the discharge power or the charge power by comparing the integrated evaluation value (deterioration index value) and the threshold at each cycle time ($\Delta t$) at which the evaluation value ($D(N)$) of deviation of the ion concentration and the integrated evaluation value ($\Sigma Dex(N)$) are calculated. Accordingly, WO 2013/046263 and JP 2014-3826 A is primarily directed to charging/discharging management in a period during which the secondary battery is used (charged/discharged), such as during vehicle traveling.

In recent years, an electric vehicle which is able to charge an on-vehicle power storage device with a power supply (hereinafter, simply referred to as "external power supply") outside a vehicle comes into practical use. In a so-called plug-in hybrid car or an electric car, charging (hereinafter, simply referred to as "external charging") of an on-vehicle secondary battery with an external power supply is performed using a system power supply or a dedicated charging stand during the stop of operation.

In such an externally chargeable electric vehicle, a use mode of the secondary battery from the stop of operation stop to the next start of operation changes with the presence or absence of external charging. Specifically, the length of the charging/discharging deactivation period of the secondary battery changes with the presence or absence of external charging. Furthermore, even in a case where a charging schedule is established such that external charging is completed in conformity with the next start time of operation by so-called timer charging, it is predicted that the length of the charging/discharging deactivation period of the secondary battery from the stop of operation to the start of external charging changes according to situations.

SUMMARY

In consideration of the above-described problem, in an externally chargeable electric vehicle, in order to appropriately prevent high rate deterioration of a nonaqueous electrolyte secondary battery, it is important to calculate a deterioration index value for charging and discharging management while reflecting a relaxation (that is, recovery of deviation of the ion concentration) behavior of high rate deterioration in the charging and discharging deactivation period of the secondary battery.

The present disclosure has been accomplished in order to solve the above-described problem, and provides a battery system for an electric vehicle configured to charge an on-vehicle power storage device with a power supply outside an electric vehicle, including an advantage of appropriately preventing high rate deterioration due to deviation of an ion concentration in an electrolyte of a nonaqueous electrolyte secondary battery while reflecting a recovery behavior of deviation of the ion concentration in a charging and discharging deactivation period.

According to an aspect of the present disclosure, there is provided a battery system for an electric vehicle in which an electric motor configured to generate any one of a braking force and a drive force of the electric vehicle is mounted. The battery system includes a secondary battery, a charger, and an electronic control unit. The secondary battery includes a nonaqueous electrolyte. The secondary battery is configured to generate any one of a braking force of the electric vehicle and a drive force of the electric vehicle by transmitting and receiving electric power to and from the electric motor. The charger is configured to charge the secondary battery by a power supply outside the electric vehicle. The electronic control unit is configured to: (i)

control charging and discharging of the secondary battery, (ii) calculate a deterioration index value based on a history of a current of the secondary battery in a use period of the secondary battery, the deterioration index value being a value for evaluating a deterioration component which degrades the input and output performance of the secondary battery according to deviation of an ion concentration in the nonaqueous electrolyte by charging and discharging of the secondary battery, (iii) restrict any one of the discharge power and the charge power of the secondary battery if the deterioration index value exceeds a predetermined restriction threshold, (iv) correct the deterioration index value at the end of a deactivation period according to deactivation relaxation coefficient at the end of the deactivation period during which the charging and discharging of the secondary battery is deactivated, the deactivation relaxation coefficient being a coefficient indicating the degree of relaxation of deviation of the ion concentration each time a given time elapses in the deactivation period, (v) set the deactivation relaxation coefficient variably based on at least a time length of the deactivation period, and (vi) set the deactivation relaxation coefficient such that, when the time length is short, the degree of relaxation of deviation of the ion concentration for the given time becomes greater than the degree of relaxation of deviation of the ion concentration when the time length is long.

According to the battery system for electric vehicle described above, it is possible to appropriately calculate the deterioration evaluation value for determining whether or not there is a need for charging or discharging restriction by comparison with the restriction threshold in the use period according to correction reflecting a recovery behavior of high rate deterioration in the charging and discharging deactivation period of the secondary battery. In particular, the deactivation relaxation coefficient is set variably such that the degree of relaxation of deviation of the ion concentration each time the given time elapses becomes great when the time length of the deactivation period is short, whereby a phenomenon in which the recovery rate of high rate deterioration becomes relatively great immediately after the start of the deactivation period can be appropriately reflected in the deterioration evaluation value by the correction processing. As a result, since an initial value of the deterioration evaluation value can be appropriately set in the new use period of the secondary battery subsequent to the end of the deactivation period, it is possible to avoid excessive restriction of charging and discharging restriction and the delay of the start of charging and discharging restriction, and to appropriately prevent the progress of high rate deterioration.

In the battery system, the electronic control unit may be configured to: (i) set the deactivation relaxation coefficient variably based on the time length and a temperature of the secondary battery in the deactivation period, and (ii) set the deactivation relaxation coefficient such that, when the temperature is high, the degree of relaxation of deviation of the ion concentration for the given time becomes greater than that when the temperature is low. In addition, the electronic control unit may be configured to set deactivation relaxation coefficient such that a difference is smaller as the time length is longer, the difference being a value of a difference between set values of the deactivation relaxation coefficient caused by a difference in temperature of the secondary battery.

According to the configuration of the battery system described above, it is possible to reflect a difference in the ion diffusion rate depending on the battery temperature to reflect the recovery behavior of high rate deterioration in the battery deactivation period in the deterioration evaluation value. In addition, if a sufficiently long time elapses, it is possible to reflect the deterioration evaluation value in a phenomenon in which the amount of recovery of high rate deterioration converges on a constant value regardless of the battery temperature.

In addition, in the battery system, the electronic control unit may be configured to: (i) acquire the temperature at the start of the deactivation period when a charging schedule designating a charging start time of the secondary battery by the charger in the deactivation period is established in advance, and (ii) further acquire the temperature multiple times until the charging start time according to the charging schedule to determine the temperature of the secondary battery for setting the deactivation relaxation coefficient.

According to the configuration of the battery system described above, at the time of application of timer charging in which the time length of the deactivation period is predictable in advance, it is possible to increase the calculation accuracy of the battery temperature in the deactivation period, and to set the deactivation relaxation coefficient as more appropriate.

In the battery system, the electronic control unit may be configured to: (i) calculate an evaluation value of the deterioration component based on a history of a current of the secondary battery in the use period, (ii) calculate a value including a value of a first polarity as the evaluation value when a distribution of the ion concentration is deviated toward a discharging side, (iii) calculate a value including a second polarity opposite to the first polarity as the evaluation value when the distribution of the ion concentration is deviated toward a charging side, (iv) separately calculate a first integrated evaluation value and a second integrated evaluation value as the deterioration index value, the first integrated evaluation value being a value on the discharging side obtained by integrating the evaluation value exceeding any one of a first threshold and a second threshold set in advance, the second integrated evaluation value is a value on the charging side obtained by integrating the evaluation value exceeding any one of a third threshold and a fourth threshold set in advance, the first threshold being set to a value including the first polarity, the second threshold being set to any one of 0 and a value including the second polarity, the third threshold being set to a value including the second polarity, and the fourth threshold being set to any one of 0 and a value including the first polarity, (v) set the deactivation relaxation coefficient as a coefficient including a first deactivation relaxation coefficient for correcting the first integrated evaluation value and a second deactivation relaxation coefficient for correcting the second integrated evaluation value, (vi) calculate the first integrated evaluation value by adding a past value of the first integrated evaluation value to a current value of the evaluation value, an absolute value of the past value of the first integrated evaluation value decreasing by the first relaxation coefficient set separately from the first deactivation relaxation coefficient with time in the use period, and the current value corresponding to any one of a part and a whole of the current evaluation value when the current evaluation value includes the first polarity and the absolute value of the current evaluation value is greater than any one of the first threshold or when the current evaluation value includes the second polarity and the absolute value of the current evaluation value is greater than the second threshold, (vii) calculate the second integrated evaluation value by adding a past value of the second integrated evaluation value to a current value of the evaluation value, an absolute value of the past value of the second integrated evaluation value decreasing by a second relaxation coefficient set separately from the second deactivation relaxation coefficient with time in the use period, and the current value corresponding to any one of the part and the whole of the current evaluation value when the current evaluation value includes the second polarity and the absolute value of the current evaluation value is greater than any one of the third threshold or when the current evaluation value includes the first polarity and the absolute value of the current evaluation value is greater than the fourth threshold, (viii) set a value including a discharging restriction threshold including the first polarity and a charging restriction threshold including the second polarity as the restriction threshold, (ix) restrict the discharge power of the secondary battery when the absolute value of the first integrated evaluation value is greater than the discharging restriction threshold when the first integrated evaluation value includes the first polarity, and (x) restrict the charge power of the secondary battery when the absolute value of the second integrated evaluation value is greater than the charging restriction threshold when the second integrated evaluation value includes the second polarity.

According to the configuration of the battery system described above, it is possible to separately integrate the first integrated evaluation value on the discharging side for use in discharging restriction management and the second integrated evaluation value on the charging side for use in charging restriction management while setting the separate thresholds based on the common evaluation value for deviation of the ion concentration in the electrolyte while decreasing the absolute values with time by the first and second relaxation coefficients. For the first and second integrated evaluation values, the first and second deactivation relaxation coefficients are set separately from the first and second relaxation coefficients in the use period, whereby it is possible to perform correction reflecting the recovery behavior of high rate deterioration in the charging and discharging deactivation period of the secondary battery. As a result, even in a nonaqueous secondary battery which is mounted in an electric vehicle including a configuration for external charging and is used including a mode of being continuously charged for a long time, it is possible to appropriately prevent high rate deterioration while further coping with both of charging and discharging during vehicle traveling and external charging since the recovery behavior of deviation of the ion concentration in the charging and discharging deactivation period is reflected.

According to the battery system for an electric vehicle of the present disclosure, in the battery system for an electric vehicle configured to charge an on-vehicle power storage device with a power supply outside the electric vehicle, it is possible to appropriately prevent high rate deterioration due to deviation of an ion concentration in an electrolyte of a nonaqueous electrolyte secondary battery while reflecting a recovery behavior of deviation of the ion concentration in a charging and discharging deactivation period.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
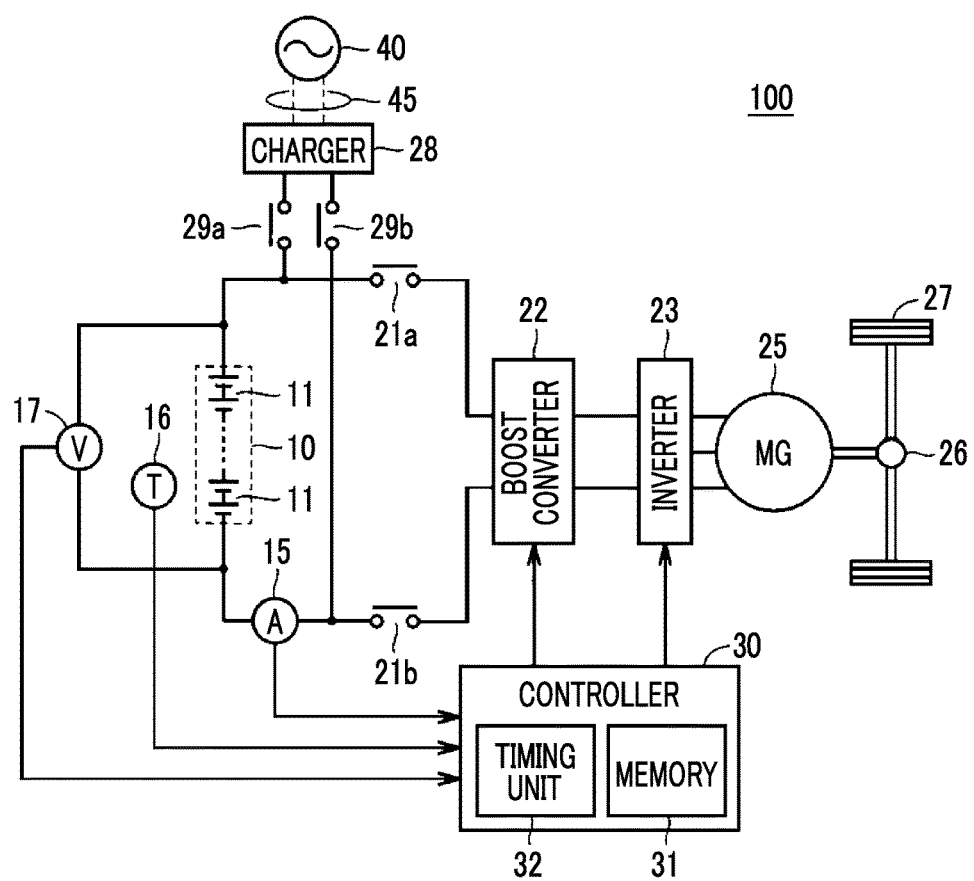
FIG. 1 is a schematic configuration diagram of a battery system for an electric vehicle according to a first embodiment of the present disclosure.

Hereinafter, an embodiment of the present disclosure will be described in detail referring to the drawings. In the following description, the same or equivalent portions in the drawings are represented by the same reference numerals, and description thereof will not be repeated in principle.

FIG. 1 is a schematic configuration diagram of a battery system for an electric vehicle according to a first embodiment of the present disclosure.

Referring to FIG. 1, an electric vehicle 100 travels with an on-vehicle secondary battery as a vehicle drive power supply. For example, the electric vehicle 100 is constituted of a hybrid car or an electric car. A hybrid car is a vehicle including, in addition to a battery, a fuel battery, an engine, and the like as a drive power source for making the vehicle travel. An electric car is a vehicle including only a battery as a drive power source of the vehicle.

The electric vehicle 100 includes a secondary battery 10, a boost converter 22, an inverter 23, a motor generator 25, a transmission gear 26, drive wheels 27, a charger 28, and a controller 30.

The secondary battery 10 is constituted of an assembled battery having a plurality of battery cells 11 electrically connected in series with one another. Each battery cell 11 is constituted of a nonaqueous secondary battery having a nonaqueous electrolyte which is represented by a lithium-ion secondary battery. A part of a plurality of battery cells 11 may be connected in parallel with one another.

A positive electrode of the battery cell 11 is formed of a material capable of occluding and emitting ions (for example, lithium ions). As the material for the positive electrode, for example, lithium cobalt oxide or lithium manganese oxide can be used. A negative electrode of the battery cell 11 is formed of a material capable of occluding and emitting ions (for example, lithium ions). As the material for the negative electrode, for example, carbon can be used. When charging the battery cell 11, the positive electrode emits ions into the electrolyte, and the negative electrode occludes ions in the electrolyte. When discharging the battery cell 11, the positive electrode occludes ions in the electrolyte, and the negative electrode emits ions into the electrolyte. The battery cell 11 is accommodated in a battery case having a square tubular shape (a rectangular parallelepiped shape).

Figure 2:
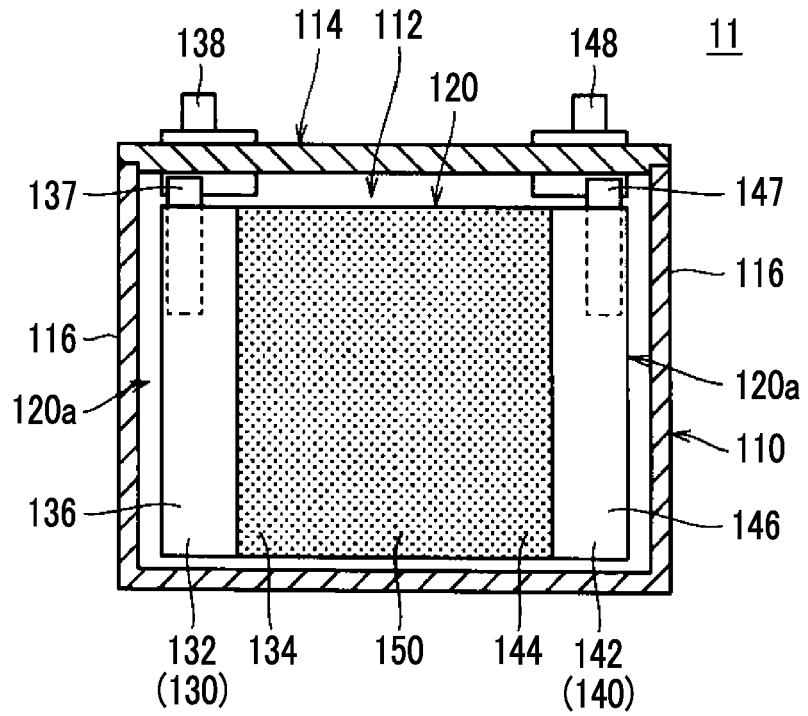
FIG. 2 is a sectional view showing a configuration example of a battery cell shown in FIG. 1.

FIG. 2 is a sectional view showing a configuration example of the battery cell. Referring to FIG. 2, the battery cell 11 has a structure in which an electrode body 120 constituted of a so-called wound body having a positive electrode and a negative electrode laminated through a separator 150 impregnated with an electrolyte (nonaqueous electrolyte) is accommodated inside the battery case 110. An opening 112 of the battery case 110 is closed by a cover 114.

The cover 114 are provided with a positive electrode terminal 138 and a negative electrode terminal 148 for external connection. The positive electrode terminal 138 and the negative electrode terminal 148 with an upper end side protruding from the surface of the cover 114 to the outside have lower end portions connected to an internal positive electrode terminal 137 and an internal negative electrode terminal 147 inside the battery case 110.

The electrode body 120 is constituted, for example, by alternately laminating a positive electrode sheet 130 and a negative electrode sheet 140 through the elongated sheet-like separator 150. The positive electrode sheet 130 is constituted to have a positive electrode active material 134 on the surface of an elongated positive electrode collector 132. The negative electrode sheet 140 is constituted to have a negative electrode active material 144 on the surface of an elongated negative electrode collector 142.

The electrode body 120 constituted of a laminate is shaped in a flat shape, for example, by pressing a wound electrode body wound around a shaft (not shown) in a tubular shape from sideways. The electrode body 120 is arranged inside the battery case 110 such that opening ends 120a, 120a shown at the right and left of the drawing face a sidewall 116 of the battery case 110.

The internal positive electrode terminal 137 and the internal negative electrode terminal 147 are respectively bonded to a positive electrode active material non-forming portion 136 of the positive electrode collector 132 and a negative electrode active material non-forming portion 146 of the negative electrode collector 142 by an appropriate method, such as ultrasonic welding or resistance welding. With this, the positive electrode sheet 130 and the negative electrode sheet 140 of the electrode body 120 are electrically connected to the internal positive electrode terminal 137 and the internal negative electrode terminal 147.

The separator 150 is interposed between the positive electrode sheet 130 and the negative electrode sheet 140, and are arranged so as to come into contact with both of the positive electrode active material 134 provided on the positive electrode sheet 130 and the negative electrode active material 144 provided on the negative electrode sheet 140. A conductive path (electrical conduction path) is formed between the positive electrode and the negative electrode by impregnating the electrolyte (nonaqueous electrolyte) into a vacancy formed in the separator 150.

The separator 150 has a width greater than the width of the laminated portions of the positive electrode active material 134 and the negative electrode active material 144 and smaller than the width of the electrode body 120. The separator 150 is provided to be sandwiched between the laminated portions of the positive electrode active material 134 and the negative electrode active material 144, thereby preventing internal short-circuiting caused by contact between the positive electrode collector 132 and the negative electrode collector 142.

In the secondary battery having a flat wound electrode body, pressure applied to the wound electrode body is locally different during charging and during discharging (for example, pressure applied to a side surface central portion of the wound electrode body is different from pressure applied to a side surface end portion), whereby deviation is likely to occur in an ion concentration in the electrolyte. For this reason, compared to a cell structure in which a positive electrode sheet and a negative electrode sheet are simply laminated, or the like, high rate deterioration described in WO 2013/046263 or JP 2014-3826 A tends to be likely to occur.

Referring to FIG. 1 again, the secondary battery 10 is connected to the boost converter 22 through system main relays 21a, 21b, and the boost converter 22 boosts an output voltage of the secondary battery 10. The boost converter 22 is connected to the inverter 23, and the inverter 23 converts a DC power from the boost converter 22 to an AC power.

The motor generator (three-phase AC motor) 25 receives the AC power from the inverter 23 and generates kinetic energy for making the vehicle travel. The kinetic energy generated by the motor generator 25 is transmitted to the wheels. When decelerating the vehicle or when stopping the vehicle, the motor generator 25 converts the kinetic energy generated at the time of braking of the vehicle to electric energy. The AC power generated by the motor generator 25 is converted to the DC power by the inverter 23. The boost converter 22 deboosts an output voltage of the inverter 23 and then supplies the deboosted voltage to the secondary battery 10. With this, a regenerative power can be stored in the secondary battery 10. In this way, the motor generator 25 is configured to generate a drive force or a braking force of the vehicle according to the transmission and reception (that is, charging/discharging of the secondary battery 10) of electric power to and from the secondary battery 10.

The boost converter 22 can be omitted. Furthermore, when a DC motor is used as the motor generator 25, the inverter 23 can be omitted.

In a case where the electric vehicle 100 is constituted of a hybrid vehicle in which an engine (not shown) is further mounted as a power source, in addition to the output of the motor generator 25, the output of the engine can be used for a drive force for vehicle traveling. Alternatively, a motor generator (not shown) which generates power with the engine output may be mounted, and the charge power of the secondary battery 10 may be generated by the engine output.

In the secondary battery 10, a current sensor 15, a temperature sensor 16, and a voltage sensor 17 are arranged. The current sensor 15 detects a current flowing in the secondary battery 10 and outputs a detection result to the controller 30. In the following description, in regard to a current value I detected by the current sensor 15, a discharge current is represented as a positive value, and a charge current is represented as a negative value. The temperature sensor 16 detects a temperature of the secondary battery 10 and outputs a detection result to the controller 30. The number of temperature sensors 16 can be appropriately set. When a plurality of temperature sensors 16 are used, an average value of the temperatures detected by a plurality of temperature sensors 16 can be used as the temperature of the secondary battery 10, or a temperature detected by a specific temperature sensor 16 can be used as the temperature of the secondary battery 10. In the following description, the temperature of the secondary battery 10 detected by the output of the temperature sensor 16 is referred to as a battery temperature Tb.

The voltage sensor 17 detects a voltage V of the secondary battery 10 and outputs a detection result to the controller 30. In this example, although the voltage of the secondary battery 10 is detected, the present disclosure is not limited thereto. For example, a voltage of each of the battery cells 11 constituting the secondary battery 10 can be detected. Furthermore, a plurality of battery cells 11 constituting the secondary battery 10 can be divided into a plurality of blocks, and a voltage of each block can be detected. Each block includes at least two battery cells 11.

The controller 30 is constituted of, for example, an electronic control unit (ECU) and controls the operations of the system main relays 21a, 21b, the boost converter 22, and the inverter 23. The controller 30 has a memory 31 which stores various kinds of information. The memory 31 also stores a program for operating the controller 30. In this example, although the controller 30 is embedded with the memory 31, the memory 31 may be provided outside the controller 30. In addition, the controller 30 further has a timing unit 32 which detects current date and time, or measures an elapsed time.

The controller 30 switches the system main relays 21a, 21b from off to on or operates the boost converter 22 and the inverter 23 if an ignition switch of the vehicle is switched from off to on. Furthermore, the controller 30 switches the system main relays 21a, 21b from on to off or stops the operation of the boost converter 22 or the inverter 23 if the ignition switch is switched from on to off.

The charger 28 supplies electric power from an external power supply 40 to the secondary battery 10. The charger 28 is connected to the secondary battery 10 through charging relays 29a, 29b. When the charging relays 29a, 29b are on, electric power from the external power supply can be supplied to the secondary battery 10.

The external power supply 40 is a power supply provided outside the vehicle, and as the external power supply 40, for example, a commercial AC power supply can be applied. The external power supply 40 and the charger 28 are connectable, for example, by a charging cable 45. That is, at the time of mounting of the charging cable 45, the external power supply 40 and the charger 28 are electrically connected to each other, thereby bringing the secondary battery 10 into an externally chargeable state.

Alternatively, the electric vehicle 100 may be configured such that electric power is transmitted between the external power supply 40 and the charger 28 in a noncontact manner. For example, electric power is transmitted by way of a power transmission coil (not shown) on the external power supply side and a power reception coil (not shown) on the vehicle side, whereby the secondary battery 10 can be charged with the external power supply 40.

In this way, in a case where an AC power is supplied from the external power supply 40, the charger 28 is configured to have a function of converting a supply power (AC power) from the external power supply 40 to a charge power (DC power) of the secondary battery 10. Alternatively, in a case where the external power supply 40 directly supplies the charge power of the secondary battery 10, the charger 28 may merely supply a DC power from the external power supply 40 to the secondary battery 10. As described above, in this embodiment, although the electric vehicle 100 is configured such that the secondary battery 10 is externally chargeable, a mode of external charging is not particularly limited.

Figure 3:
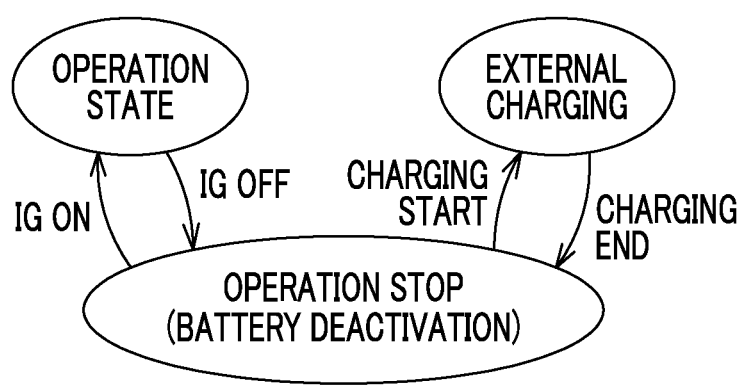
FIG. 3 is a state transition diagram of the electric vehicle shown in FIG. 1.

FIG. 3 is a state transition diagram of the electric vehicle 100 shown in FIG. 1. Referring to FIG. 3, in the electric vehicle 100, since both of the system main relays 21a, 21b and the charging relays 29a, 29b are turned off in an operation stop state, the secondary battery 10 is not charged or discharged. That is, a period during which the electric vehicle 100 is in the operation stop state corresponds to a "deactivation period" of the secondary battery 10. In the following description, the deactivation period of the secondary battery 10 is simply referred to as a "battery deactivation period".

If the ignition switch is turned on from the operation stop state (IG-on), the system main relays 21a, 21b are on, whereby the electric vehicle 100 transits to a vehicle operation state, that is, a travelable state, using the electric power of the secondary battery 10.

In the vehicle operation state, the output of the motor generator 25 is controlled according to charging/discharging of the secondary battery 10 such that the drive force or the braking force of the vehicle is generated according to a driver's operation of an accelerator pedal or a brake pedal. That is, in the vehicle operation state (IG-on state), the secondary battery 10 is charged or discharged according to the traveling situation of the electric vehicle 100.

In the vehicle operation state (IG-on state), if the ignition switch is turned off (IG-off), the system main relays 21a, 21b are turned off, whereby the electric vehicle 100 transits to the operation stop state.

In the operation stop state, if the charging relays 29a, 29b are turned on and external charging of the secondary battery 10 by the external power supply 40 is started, the electric vehicle 100 transits to an external charging state. For example, in a state where power supply can be performed from the external power supply 40 to the electric vehicle 100 by the charging cable 45 or the like, external charging is started with a user's charging start operation or reaching at a charging start time according to a time schedule as a trigger.

In external charging (hereinafter, referred to as "timer charging") according to the time schedule, a charging schedule is established in advance such that charging ends at a charging end time automatically by manual setting with a user input, past achievement learning, or the like. Then, even if the secondary battery 10 is brought into the externally chargeable state by the mounting of the charging cable 45 or the like, in a period until the charging start time is reached, the start of external charging of the secondary battery 10 is on standby with turning-off of the charging relays 29a, 29b.

In the external charging state, if the State of Charge (SOC) of the secondary battery 10 reaches a threshold (for example, a fully charged state), external charging ends and the charging relays 29a, 29b are turned off, whereby the electric vehicle 100 returns to the operation stop state. Alternatively, even in a case where external charging is ended by a user's operation, the electric vehicle 100 transits from the external charging state to the operation stop state with turning-off of the charging relays 29a, 29b.

In this way, in the vehicle operation state and the external charging state, since the system main relays 21a, 21b or the charging relays 29a, 29b are turned on, the secondary battery 10 is brought into a chargeable or dischargeable state. That is, a period during which the electric vehicle 100 is in the vehicle operation state or the external charging state corresponds to a "use period" of the secondary battery 10. In the following description, the use period of the secondary battery 10 is simply referred to as a "battery use period".

In the externally chargeable electric vehicle 100, it is understood that a use mode of the secondary battery 10 until the vehicle operation is started with the next IG-on after the vehicle is brought into the operation stop state with IG-off changes with the presence or absence of external charging. That is, the time length of the battery deactivation period changes with the presence or absence of external charging. Alternatively, in a case where external charging is performed by timer charging, the length of the deactivation period of the secondary battery 10 from IG-off to the start of external charging changes with the situation of SOC or the like at the time of IG-off.

Accordingly, in the externally chargeable electric vehicle, in order to suppress high rate deterioration of the nonaqueous electrolyte secondary battery, only management of the deterioration index value in the use period of the secondary battery 10 described in WO 2013/046263 and JP 2014-3826 A is insufficient, and it is important to reflect the recovery behavior of deviation of the ion concentration in the battery deactivation period in the deterioration index value (that is, an initial value of the deterioration index value at the time of resuming of use) at the end of the battery deactivation period.

Specifically, if the amount of recovery (amount of relaxation) of deviation of the ion concentration in the battery deactivation period is evaluated to be excessively small, in the battery use period, there is a concern that charging/discharging restriction is excessively imposed and the output of the secondary battery 10 is restricted more than necessary. If the amount of relaxation of deviation of the ion concentration in the battery deactivation period is evaluated to be excessively large, in the use period, there is a concern that the start of charging/discharging restriction is delayed and an increase in internal resistance due to high rate deterioration of the secondary battery 10 progresses.

Figure 4:
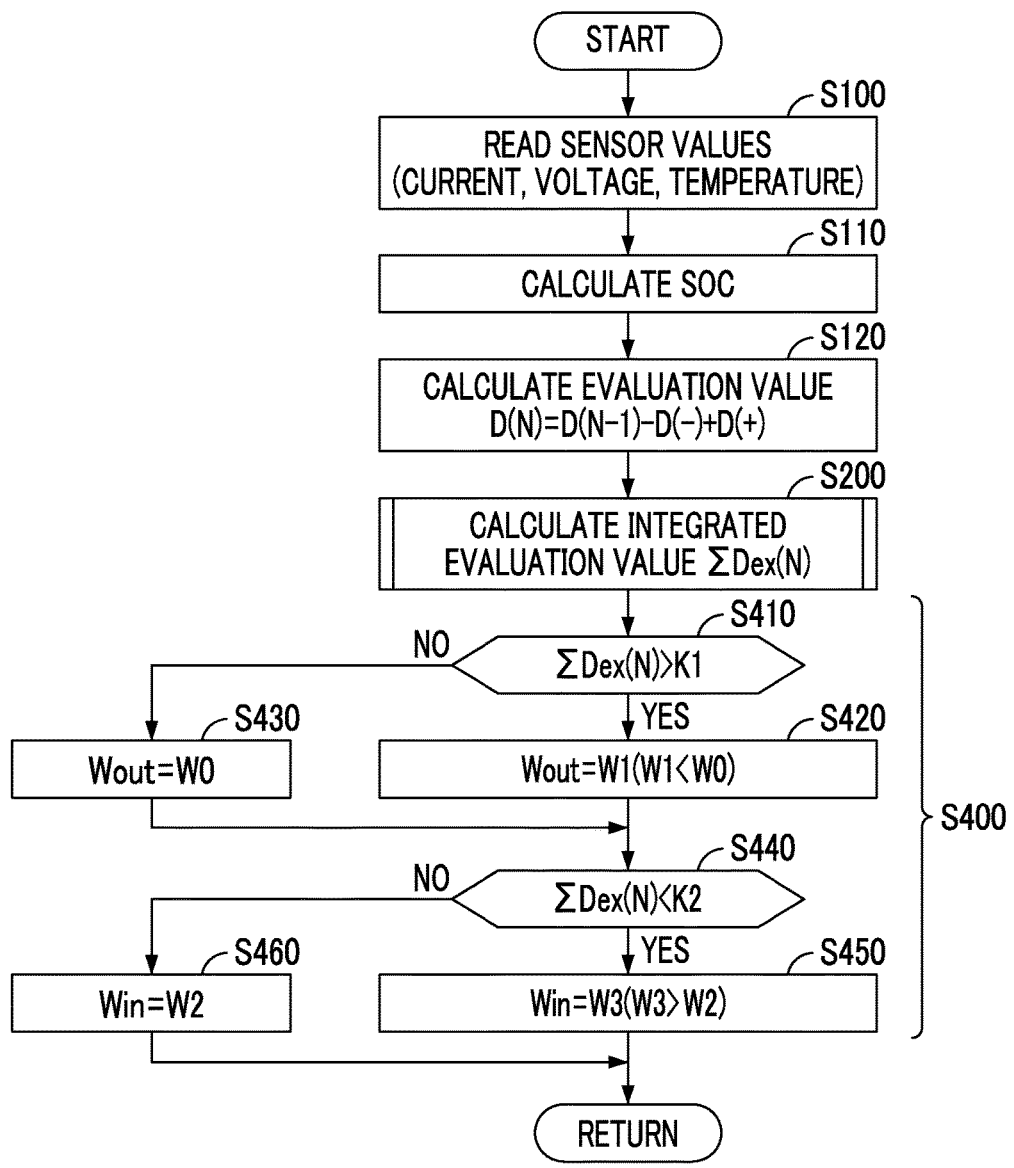
FIG. 4 is a flowchart illustrating control processing in a battery use period for suppressing high rate deterioration in the battery system according to the first embodiment.

For this reason, in the battery system according to the first embodiment of the present disclosure, as described below, high rate deterioration in the battery use period and the battery deactivation period is managed and controlled (management of high rate deterioration). FIG. 4 is a flowchart illustrating control processing for suppressing high rate deterioration in the battery system according to the first embodiment. The control processing shown in FIG. 4 is repeatedly executed by the controller 30 in the battery use period.

Referring to FIG. 4, in Step S100, the controller 30 reads the output values of the current sensor 15, the temperature sensor 16, and the voltage sensor 17. With this, the current, voltage, and temperature of the secondary battery 10 are detected.

In Step S110, the controller 30 calculates (estimates) the SOC of the secondary battery 10 based on the current value obtained in Step S100. The SOC is defined by a ratio (percentage) of a current charge capacity to the full charge capacity of the secondary battery 10. A calculation method of the SOC can selectively employ known methods, such as a method using current value integration (Coulomb count) or a method using estimation of an open circuit voltage (OCV).

Subsequently, in Step S120, the controller 30 calculates an evaluation value D(N) for evaluating high rate deterioration. As shown in WO 2013/046263 and JP 2014-3826 A, the evaluation value D(N) is a quantitative value for evaluating a deterioration component degrading the input/output performance of the secondary battery 10 with deviation of the ion concentration in the nonaqueous electrolyte due to charging/discharging. The evaluation value D(N) can be calculated by Expression (1) described below, as in WO 2013/046263 and JP 2014-3826 A.

$$D(N)=D(N-1)-D(-)+D(+) \quad (1)$$

In Expression (1), with respect to the evaluation value D(N) in a present (N-th) control cycle (N: a natural number equal to or greater than 2), an evaluation value in a previous cycle is denoted as D(N−1). In an initial state, that is, in a state where there is no deviation in the ion concentration, D(N)=0. In the following description, a cycle time corresponding to an elapsed time from an (N−1)th cycle to an N-th cycle is denoted as Δt.

Since the control processing of FIG. 4 is executed in the battery use period during which the secondary battery 10 is charged or discharged, the cycle time Δt becomes a value of $10^{-1}$ to $10^{0}$ (sec) order.

In Expression (1), D(−) and D(+) are indicated by Expressions (2) and (3) described below.

$$D(-)=A \times \Delta t \times D(N-1) \quad (2)$$

$$D(+)=B/C \times I \times \Delta t \quad (3)$$

In Expression (2), A indicates a forgetting coefficient, and the higher the rate of ion diffusion, the greater the forgetting coefficient A. Accordingly, as shown in WO 2013/046263 and JP 2014-3826 A, the forgetting coefficient A can be set based on the SOC and temperature of the secondary battery 10. A is set within a range of 0<A×Δt<1.

In Expression (3), B indicates a current coefficient, and C indicates a limit value. The current coefficient B and the limit value C can be set based on the temperature and SOC of the secondary battery 10 as described in WO 2013/046263 and JP 2014-3826 A. For the current value I, a value detected in the processing of Step S100 can be used.

As will be understood from Expression (3), during discharging satisfying I>0, when |I| is great, or when the cycle time Δt is long, the evaluation value D(N) changes in a positive direction. On the contrary, during charging satisfying I<0, when |I| is great, or when the cycle time Δt is long, the evaluation value D(N) changes in a negative direction. In this way, the term "+D(+)" indicates an increase in deviation of the ion concentration according to discharging or current.

D(−) indicates the amount of decrease (recovery) of deviation of the ion concentration according to ion diffusion for the cycle time Δt. The is, the polarity of D(−) is the same as that of D(N−1), and "−D(−)" is a term which changes D(N) toward 0. In Expression (2), when (A×Δt) is close to 1, that is, when the coefficient A is large, or when the cycle time Δt is long, the evaluation value D(N) changes so as to quickly become close to 0.

Accordingly, in regard to the evaluation value D(N), D(N)>0 indicates that the ion concentration is deviated in a discharging direction, and D(N)<0 indicates that the ion concentration is deviated in a charging direction.

It is described for confirmation that the calculation of the evaluation value D(N) is not limited to the above-described method if the amount of increase of deviation of the ion concentration with the charge or discharge current for the cycle time and the amount of decrease (recovery) of deviation with ion diffusion is calculated quantitatively.

In addition, in Step S200, the controller 30 calculates an integrated evaluation value ΣDex(N) based on the evaluation value D(N) determined in Step S120.

Figure 5:
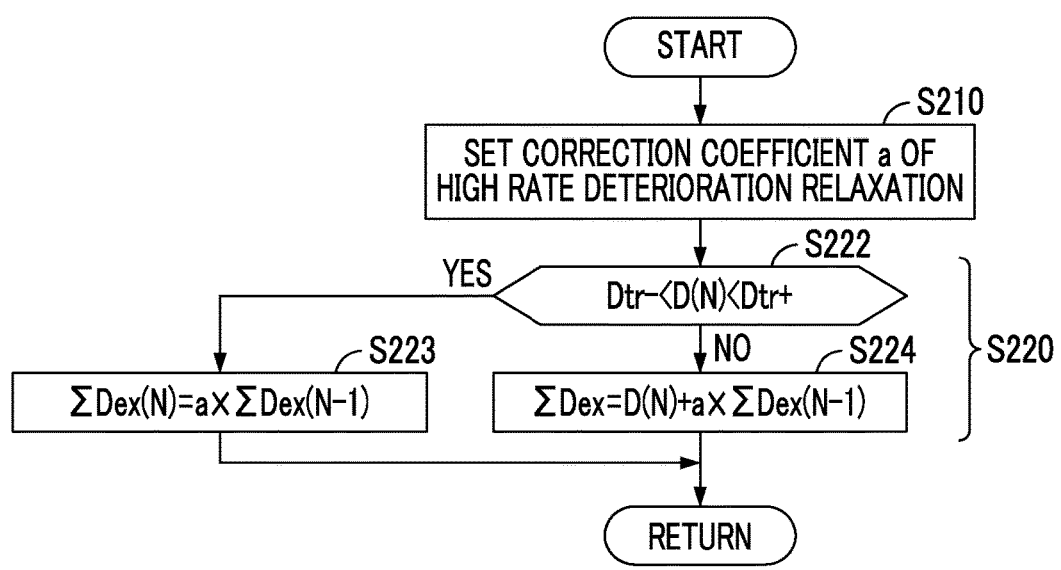
FIG. 5 is a flowchart illustrating the details of calculation processing of an integrated evaluation value in FIG. 4.

FIG. 5 is a flowchart showing control processing in Step S200 of FIG. 4, that is, the details of calculation processing of the integrated evaluation value.

Referring to FIG. 5, in Step S210, as in WO 2013/046263, the controller 30 sets the correction coefficient a for reflecting relaxation of high rate deterioration with time. The relaxation coefficient a is set within a range of 0<a<1.0.

The controller 30 executes Step S220 for integration processing of an integrated evaluation value ΣDex1(N). Step S220 has Steps S222 to S224.

In Step S222, the controller 30 compares the evaluation value D(N) with thresholds Dtr+, Dtr−. The threshold Dtr+ is set to a positive value (Dtr+>0), and the threshold Dtr− is set to a negative value (Dtr−<0).

When Dtr−<D(N)<Dtr+, that is, when the evaluation value D(N) exceeds the thresholds Dtr+, Dtr− (when the determination result in S222 is YES), the controller 30 progresses the process to Step S223, and calculates the integrated evaluation value ΣDex(N) in the present control cycle according to Expression (4) described below.

$$\Sigma Dex(N) = a \times \Sigma Dex(N-1) \quad (4)$$

In Step S223, the evaluation value D(N) is not integrated, and relaxation of high rate deterioration is reflected in the integrated evaluation value according to the relaxation coefficient a. That is, the integrated evaluation value ΣDex(N) is updated such that the absolute value decreases, while maintaining the polarity.

In contrast, when D(N)<Dtr− or D(N)>Dtr+, that is, when ID(N)|>|Dtr+| in a case where D(N)>0, or when ID(N)|>|Dtr− | in a case where D(N)<0 (when the determination result in S222 is NO), since the evaluation value D(N) exceeds the threshold Dtr+ or Dtr−, the controller 30 progresses the process to Step S224.

In Step S224, the integrated evaluation value ΣDex(N) in the present control cycle is calculated according to Expression (5) described below.

$$\Sigma Dex(N) = D(N) + a \times \Sigma Dex(N-1) \quad (5)$$

In Expression (5), the evaluation value D(N) exceeding the threshold Dtr+ or Dtr− is added to Expression (4). In Expression (5), in regard to the evaluation value D(N), a partial value, for example, a value of only an excess (D(N)−Dtr+ or D(N)−Dtr−) with respect to the threshold Dtr+ or Dtr− may be added.

In this way, ΣDex(N) is calculated by adding a value of the absolute value of past ΣDex(N−1) whose absolute value is reduced by the relaxation coefficient a and a value corresponding to a part or the whole of D(N) when the current evaluation value D(N) exceeds the thresholds Dtr+, Dtr−. That is, as in WO 2013/046263, relaxation of high rate deterioration with time is reflected by the relaxation coefficient a, whereby it is possible to prevent discharging restriction from becoming excessive since the integrated evaluation value ΣDex(N) is excessively large with respect to practical deviation of the ion concentration.

Referring to FIG. 4 again, in Step S200, the control processing shown in FIG. 5 is executed, whereby the integrated evaluation value ΣDex(N) is calculated. In Step S400, the controller 30 sets a discharge power upper limit value Wout and a charge power upper limit value Win of the secondary battery 10 using the integrated evaluation value ΣDex(N). Step S400 has Steps S410 to S430 for discharging restriction and Steps S440 to S460 for charging restriction.

An input/output power Pb (Pb=V×I) from the secondary battery 10 is indicated by Pb>0 during discharging, and is indicated by Pb<0 during charging. The discharge power upper limit value Wout is set within a range of Wout≥0, and when Wout=0, discharging from the secondary battery 10 is inhibited. The charge power upper limit value Win is set within a range of Win≤0, and when Win=0, charging to the secondary battery 10 is inhibited. That is, the output of the motor generator 25 is restricted within a range in which Win≤Pb≤Wout is maintained.

In Step S410, the controller 30 compares the integrated evaluation value ΣDex(N) with a discharging restriction threshold K1 (K1>0) determined in advance. Then, when ΣDex (N)≤K1, that is, when the integrated evaluation value ΣDex(N) does not reach the discharging restriction threshold K1 (when the determination result in S410 is NO), the controller 30 progresses the process to Step S430, and sets the discharge power upper limit value Wout=W0 (W0>0). W0 is a default value, and for example, corresponds to a rated output power of the secondary battery 10. W0 may be set variably according to the temperature or SOC of the secondary battery 10.

In contrast, when ΣDex1(N)>K1, that is, when |ΣDex(N)|>|K11 in a case where ΣDex(N) is a positive value (when the determination result in S410 is YES), since the integrated evaluation value ΣDex(N) exceeds the discharging restriction threshold K1, the controller 30 progresses the process to Step S420.

In Step S420, the discharge power upper limit value Wout=W1 (W1<W0) is set. The discharge power upper limit value Wout is set to be smaller than that in Step S430, whereby discharging from the secondary battery 10 is restricted.

Similarly, in Step S440, the controller 30 compares the integrated evaluation value ΣDex(N) with a charging restriction threshold K2 (K2<0) determined in advance. Then, when ΣDex(N) K2, that is, when the integrated evaluation value ΣDex(N) does not reach the charging restriction threshold K2 (when the determination result in S440 is NO), the controller 30 progresses the process to Step S460, and sets the charge power upper limit value Win=W2 (W2<0). W2 is a default value, and for example, corresponds to a rated charge power of the secondary battery 10. W2 may be set variably according to the temperature or SOC of the secondary battery 10.

In contrast, when ΣDex(N)<K2, that is, when |ΣDex(N)|>|K2| in a case where ΣDex(N) is a negative value (when the determination result in S440 is YES), since the integrated evaluation value ΣDex(N) exceeds the charging restriction threshold K2, the controller 30 progresses the process to Step S450.

In Step S450, the discharge power upper limit value Win=W3 (W3>W2) is set. The discharge power upper limit value Win is set to be greater than that in Step S430 (that is, the absolute value is smaller), charging to the secondary battery 10 is restricted.

In this way, the discharging restriction threshold K1 and the charging restriction threshold K2 correspond to a "restriction threshold". In this way, in the first embodiment, the integrated evaluation value $\Sigma Dex(N)$ which is compared with the discharging restriction threshold K1 and the charging restriction threshold K2 is used as a "deterioration index value" for evaluating a deterioration component degrading the input/output performance of the secondary battery 10 due to high rate deterioration.

Figure 6:
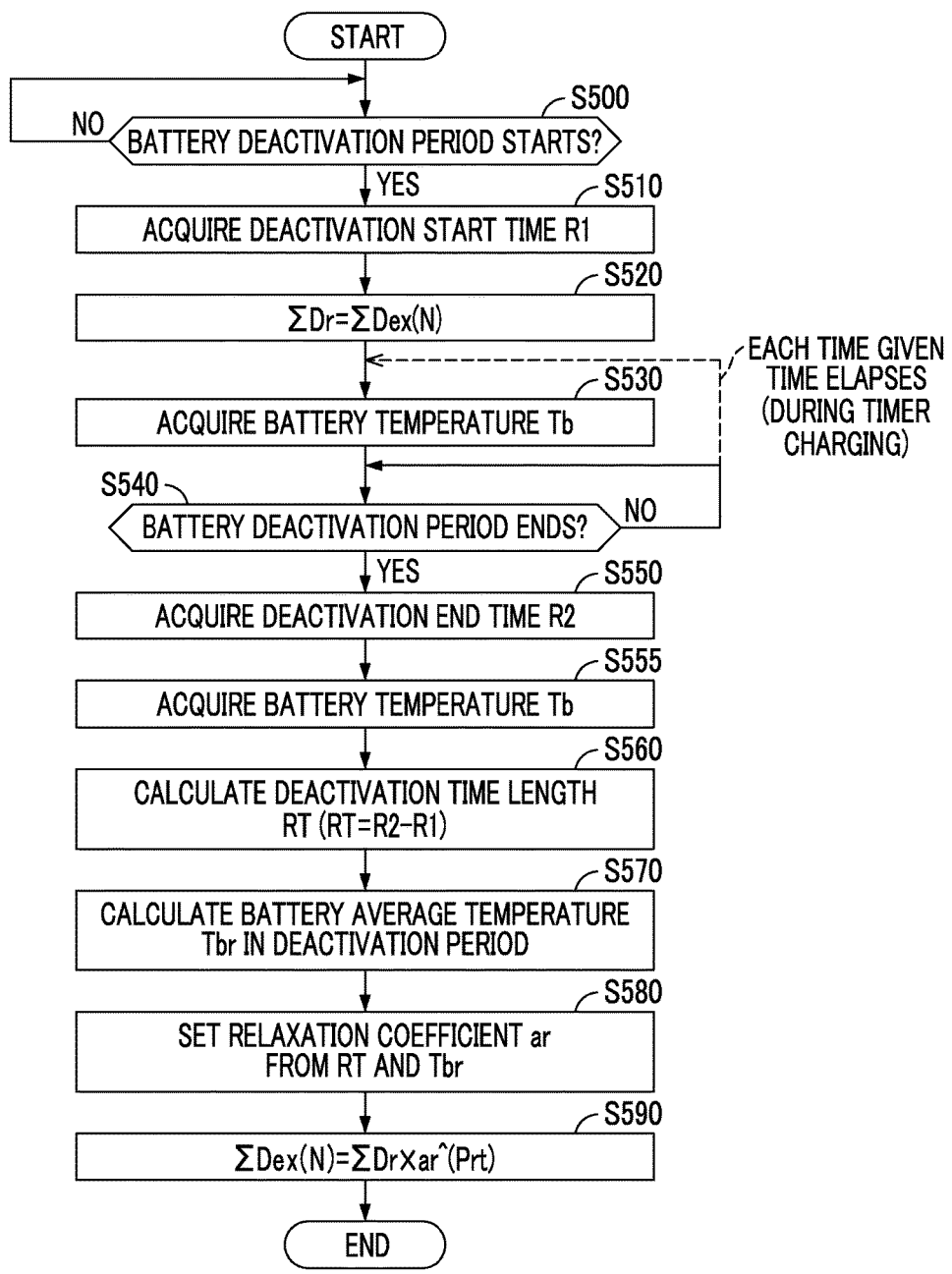
FIG. 6 is a flowchart illustrating correction processing of the integrated evaluation value in the battery deactivation period in the battery system according to the first embodiment.

Next, FIG. 6 is a flowchart showing the details of calculation processing of the integrated evaluation value (deterioration index value) in the battery deactivation period in the battery system for an electric vehicle according to the first embodiment. The control processing shown in FIG. 6 is executed by the controller 30.

Referring to FIG. 6, in Step S500, the controller 30 determines whether or not the battery deactivation period is started. In the state transition diagram shown in FIG. 3, when the vehicle transits from the vehicle operation state to the operation stop state by IG-off, and when charging ends in the external charging state and the vehicle returns to the operation stop state, the start of the battery deactivation period is detected, and the determination result in Step S500 is YES. At other timings, the determination result in Step S500 is NO, and the processing after Step S510 is not activated.

In this way, the controller 30 activates the processing after Step S510 at the start timing of the battery deactivation period, whereby the correction processing of the integrated evaluation value (deterioration index value) in the battery deactivation period is executed.

If the battery deactivation period is started (when the determination result in S500 is YES), in Step S510, the controller 30 acquires a deactivation start time R1 by a timing function of the timing unit 32. In addition, in Step S520, the controller 30 stores the integrated evaluation value $\Sigma Dex(N)$ at the current time as an initial value $\Sigma Dr$ of the integrated evaluation value in the battery deactivation period.

In addition, in Step S530, the controller 30 acquires the battery temperature Tb at the start of the battery deactivation period.

In Step S540, the controller 30 determines whether or not the battery deactivation period ends. In the state transition diagram shown in FIG. 3, when the vehicle transits from the operation stop state to the vehicle operation state by IG-on, and when external charging is started and the vehicle transits from the operation stop state to the external charging state, the end of the battery deactivation period is detected, and the determination result in Step S500 is YES. At other timings, the determination result in Step S540 is NO, and the processing after Step S550 is not executed.

In the battery deactivation period, as described above, Step S530 is executed at least at the start of the battery deactivation period. In addition, while the determination result in Step S540 is NO, the processing of Step S530 may be repeatedly executed with time, thereby acquiring the battery temperature Tb multiple times in the battery deactivation period.

In particular, for a standby time of external charging when timer charging is instructed, the end timing of the battery deactivation period can be predicted. Accordingly, the execution timing of Step S530, that is, the timing of acquire the battery temperature Tb multiple times can be established in advance at the start of the battery deactivation period.

If the battery deactivation period is ended (when the determination result in S540 is YES), in Step S550, the controller 30 acquires a deactivation end time R2 by the timing function of the timing unit 32. In addition, in Step S555, the controller 30 acquires the battery temperature Tb at the end of the battery deactivation period.

The controller 30 progresses the process to Step S560, and calculates a time length RT (hereinafter, simply referred to as a "deactivation time length RT") of the battery deactivation period according to the difference between the deactivation end time R2 and the deactivation start time R1.

In addition, in Step S570, the controller 30 calculates a battery average temperature Tbr in the battery deactivation period. The battery average temperature Tbr can be calculated using at least the battery temperatures Tb acquired at the start (S530) and the end (S555) of the battery deactivation period. Alternatively, in a case where the battery temperature Tb is acquired multiple times in the battery deactivation period, such as during standby of timer charging, the battery temperatures Tb are further used, whereby the calculation accuracy of the battery average temperature Tbr, that is, the setting accuracy of a relaxation coefficient ar can be increased.

In addition, in Step S580, the controller 30 sets a relaxation coefficient ar in the battery deactivation period. Here, the relaxation coefficient ar is set separately from the relaxation coefficient a (Expression (5)) for use in calculating the integrated evaluation value $\Sigma Dex(N)$ in the battery use period. Then, the relaxation coefficient ar is set variably according to at least the deactivation time length RT, and preferably, according to the deactivation time length RT and the battery average temperature Tbr.

Figures 7, 8:
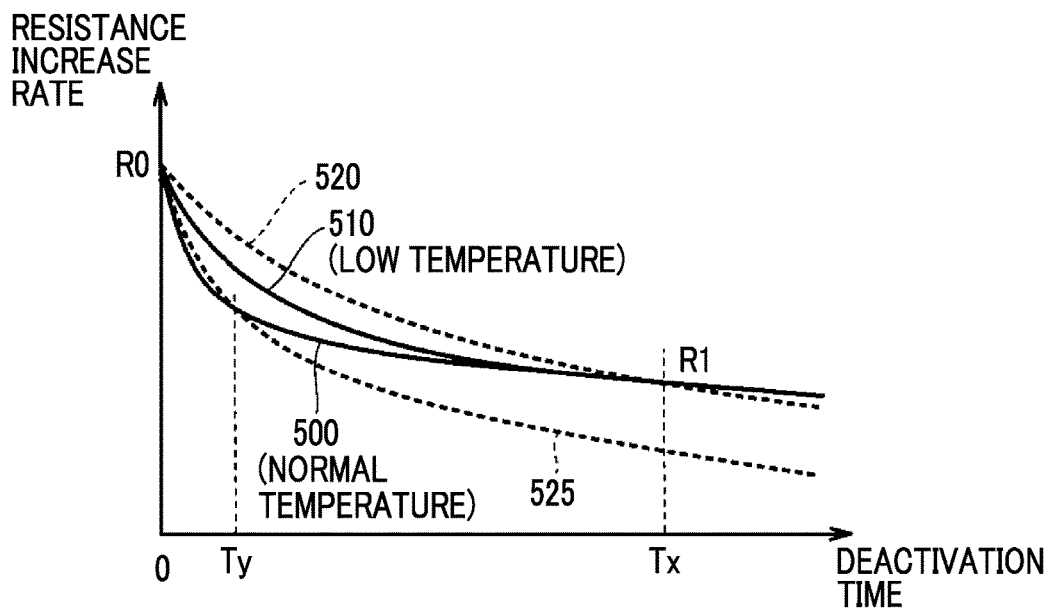
FIG. 7 is a graph conceptually showing a change behavior of a resistance increase rate in the battery deactivation period by the high rate deterioration.
FIG. 8 is a conceptual diagram illustrating variable setting of a relaxation coefficient in the battery deactivation period in the battery system.

FIG. 7 is a graph conceptually showing a change behavior of a resistance increase rate in the battery deactivation period due to high rate deterioration. The resistance increase rate on the vertical axis of FIG. 7 is defined by a ratio of a value obtained by dividing a current resistance value by a resistance value when deviation (high rate deterioration) of the ion concentration does not occur to an internal resistance value of the secondary battery 10. That is, in FIG. 7, a region where the resistance increase rate >1 is shown.

Referring to FIG. 7, in regard to the resistance increase rate due to high rate deterioration in the battery deactivation period of the secondary battery 10, a characteristic line 500 indicates transition at normal temperature of the secondary battery 10, and a characteristic line 510 indicates transition at low temperature of the secondary battery 10. FIG. 7 graphically shows the knowledge relating to a decrease behavior of the resistance increase rate (that is, the recovery behavior of high rate deterioration) in the battery deactivation period obtained by the inventors' analysis of practical experiment results.

As will be understood from FIG. 7, the resistance increase rate of the secondary battery 10 due to high rate deterioration gradually decreases with time in the battery deactivation period. However, the knowledge that the resistance increase rate decreases rapidly immediately after the start of the battery deactivation period and the decrease is gradual with time is obtained.

In addition, the decrease behavior of the resistance increase rate also depends on the battery temperature Tb. Specifically, the decrease in resistance increase rate is gradual at low temperature compared to normal temperature. If a sufficiently long time elapses, the amount of decrease of the resistance increase rate (from the start of the battery deactivation period) is identical regardless of the battery temperature Tb. These phenomenons are estimated to indicate characteristics in which an ion diffusion rate changes with the elapsed time and the battery temperature in the battery deactivation period.

If the integrated evaluation value ΣDex(N) described in WO 2013/046263 simply expands to the battery deactivation period, the change (decrease) in resistance increase rate is estimated according to an exponential function $a^x$ (in the following description, denoted as "a^x") which has an elapsed time x as a variable with the relaxation coefficient a (0<a<1.0) having a constant value as the bottom. However, if the relaxation coefficient is a constant value, there is a concern that the characteristics in which the degree of decrease of the resistance increase rate changes with time cannot be sufficiently reflected.

In FIG. 7, characteristic lines 520 and 525 when transition of the resistance increase rate is calculated by the exponential function with the relaxation coefficient (bottom) having a constant value are further denoted by dotted lines. The characteristic line 520 indicates transition of the resistance increase rate when the relaxation coefficient a is determined so as to conform to the resistance increase rate at the time Tx corresponding to when the battery deactivation period is long. The characteristic line 525 indicates transition of the resistance increase rate when the relaxation coefficient a is determined so as to conform to the resistance increase rate at the time Ty corresponding to when the battery deactivation period is short.

As will be understood from comparison of the practical characteristic lines 500, 510 and the characteristic lines 520, 525 by the exponential function, in the estimation with the relaxation coefficient (bottom) being constant, it is difficult to appropriately reflect the recovery behavior of high rate deterioration in the integrated evaluation value ΣDex(N) corresponding to when the time length of the battery deactivation period is short and when the time length of the battery deactivation period is long.

Accordingly, in the battery system for an electric vehicle according to the first embodiment, as shown in FIG. 8, in order to appropriately reflect the characteristics (FIG. 7) of the ion diffusion rate in the battery deactivation period, the relaxation coefficient (ar) in the battery deactivation period is set variably based on at least the deactivation time length RT separately from the relaxation coefficient a in the battery use period.

Referring to FIG. 8, the relaxation coefficient ar (0<ar<1.0) in the battery deactivation period is set to a smaller value in a case where the deactivation time length RT is short than that in a case where the deactivation time length RT is long. The relaxation coefficient ar can be set so as to increase continuously or in a stepwise manner with an increase in the deactivation time length RT.

In addition, with respect to the battery average temperature Tbr, the relaxation coefficient ar is set to a smaller value in a case where the battery average temperature Tbr is higher than that in a case where the battery average temperature Tbr is low. That is, the relaxation coefficient ar can be set so as to increase continuously or in a stepwise manner with a decrease in the battery average temperature Tbr with respect to the same deactivation time length RT.

The difference in the relaxation coefficient ar with respect to the battery temperature difference is set to be smaller when the deactivation time length RT is longer. Then, it is preferable that the relaxation coefficient ar is set to become a constant value regardless of the battery average temperature Tbr if the deactivation time length RT becomes sufficiently long. This reflects that, in FIG. 7, if the deactivation time becomes sufficiently long, the resistance increase rate substantially has the same value between at normal temperature (characteristic line 500) and at low temperature (characteristic line 510).

For example, a map according to the characteristics shown in FIG. 8 is created in advance, thereby setting the relaxation coefficient ar in Step S580.

Referring to FIG. 6 again, in Step S590, the controller 30 executes the correction processing of the integrated evaluation value ΣDex(N) according to an exponential function of Expression (6) described below using the initial value ΣDr which is the integrated evaluation value ΣDex(N) at the start of the battery deactivation period in Step S520, the relaxation coefficient ar (S580), and a parameter Prt based on the deactivation time length RT.

$$\Sigma Dex(N) = \Sigma Dr \times ar^{Prt} \quad (6)$$

In Expression (6), Prt is a parameter indicating the length of the deactivation period indicated by Prt=RT/Δt. In calculating Prt, other than using the cycle time Δt described in FIG. 4 in common, ΔT may be set separately from the cycle time Δt (for example, ΔT is about one hour), and Prt=RT/ΔT may be established. The relaxation coefficient ar can be set in advance in consideration of Δt or ΔT so as to conform to a decrease rate of the resistance increase rate with time according to the characteristics of FIG. 7. In this way, the relaxation coefficient ar indicates the decrease rate (that is, the degree of relaxation of deviation of the ion concentration) of the resistance increase rate each time a given time elapses in the battery deactivation period, and corresponds to a "deactivation relaxation coefficient".

The integrated evaluation value ΣDex(N) can be corrected by Expression (6) so as to reflect the decrease (that is, recovery of high rate deterioration) in the resistance increase rate in the initial value ΣDr and the bottom ar (0<ar<1.0) by the exponential function with Prt as a variable in the battery deactivation period shown in FIG. 7. As will be understood from Expression (6), when the relaxation coefficient ar (0<ar<1.0) is set to a smaller value, the recovery rate of high rate deterioration, that is, the degree of relaxation of deviation of the ion concentration becomes greater.

The integrated evaluation value ΣDex(N) after the correction processing calculated in Step S590 is used as an initial value of the integrated evaluation value ΣDex(N) in the new battery use period started with the end of the battery deactivation period. Then, in the battery use period, in order to suppress high rate deterioration in the battery use period (the vehicle operation state or the external charging state), charging/discharging management based on the integrated evaluation value ΣDex(N) is executed continuously according to the processing shown in FIGS. 4 and 5.

In this way, according to the battery system for an electric vehicle according to the first embodiment, it is possible to appropriately calculate the integrated evaluation value ΣDex (N) as a "deterioration evaluation value" according to the correction processing reflecting the recovery behavior of high rate deterioration in the battery deactivation period. Accordingly, in the battery use period, it is possible to avoid excessive restriction of charging/discharging restriction and the delay of the start of charging/discharging restriction, and to appropriately prevent the progress of high rate deterioration.

In particular, the relaxation coefficient ar is set variably such that the relaxation coefficient ar becomes small when the time length of the battery deactivation period is short, whereby it is possible to appropriately reflect a phenomenon (FIG. 7), in which the decrease rate of the resistance increase rate becomes relatively great immediately after the start of the battery deactivation period, in the deterioration evaluation value (integrated evaluation value $\Sigma Dex(N)$) by the correction processing.

The relaxation coefficient ar is set variably further reflecting the battery temperature in the battery deactivation period, whereby it is possible to reflect the difference in the ion diffusion rate depending on the battery temperature to reflect the recovery behavior of high rate deterioration in the battery deactivation period in the integrated evaluation value $\Sigma Dex(N)$. In addition, if a sufficiently long time elapses, it is possible to reflect the deterioration evaluation value in a phenomenon in which the amount of recovery of high rate deterioration converges on a constant value regardless of the battery temperature Tb.

Next, a second embodiment of the present disclosure will be described. As shown in FIG. 3, in an externally chargeable electric vehicle, the battery use period includes both of the vehicle operation state and the external charging state in which the charging/discharging mode of the secondary battery 10 is different. Specifically, in the vehicle operation state, discharging and charging of the secondary battery 10 occur intermittently according to a drive force and a braking force by the motor generator 25. In the external charging state, the secondary battery 10 is charged continuously with a comparatively large current.

Accordingly, as in JP 2014-3826 A, if determination regarding both of excessive discharging and excessive charging is performed using a single integrated evaluation value (deterioration index value), there is a concern that it is not possible to appropriately realize charging/discharging restriction for preventing high rate deterioration. For example, if the thresholds Dtr+ and Dtr− or the relaxation coefficient a for determining the integrated evaluation value $\Sigma Dex(N)$ are adjusted corresponding to prevention of high rate deterioration during vehicle operation, there is a concern that it is not possible to realize appropriate charging/discharging restriction for the secondary battery being used even in the external charging state.

Accordingly, in the second embodiment, an example in which an integrated evaluation value $\Sigma Dex1(N)$ for excessive discharging management and an integrated evaluation value $\Sigma Dex2(N)$ for excessive charging management are calculated separately as a "deterioration evaluation value" for high rate deterioration will be described. In the following description, the integrated evaluation value ($\Sigma Dex1(N)$) for managing excessive discharging is simply referred to as "an integrated evaluation value on a discharging side", and the integrated evaluation value ($\Sigma Dex2(N)$) for managing excessive charging is simply referred to as "an integrated evaluation value on a charging side".

Figure 9:
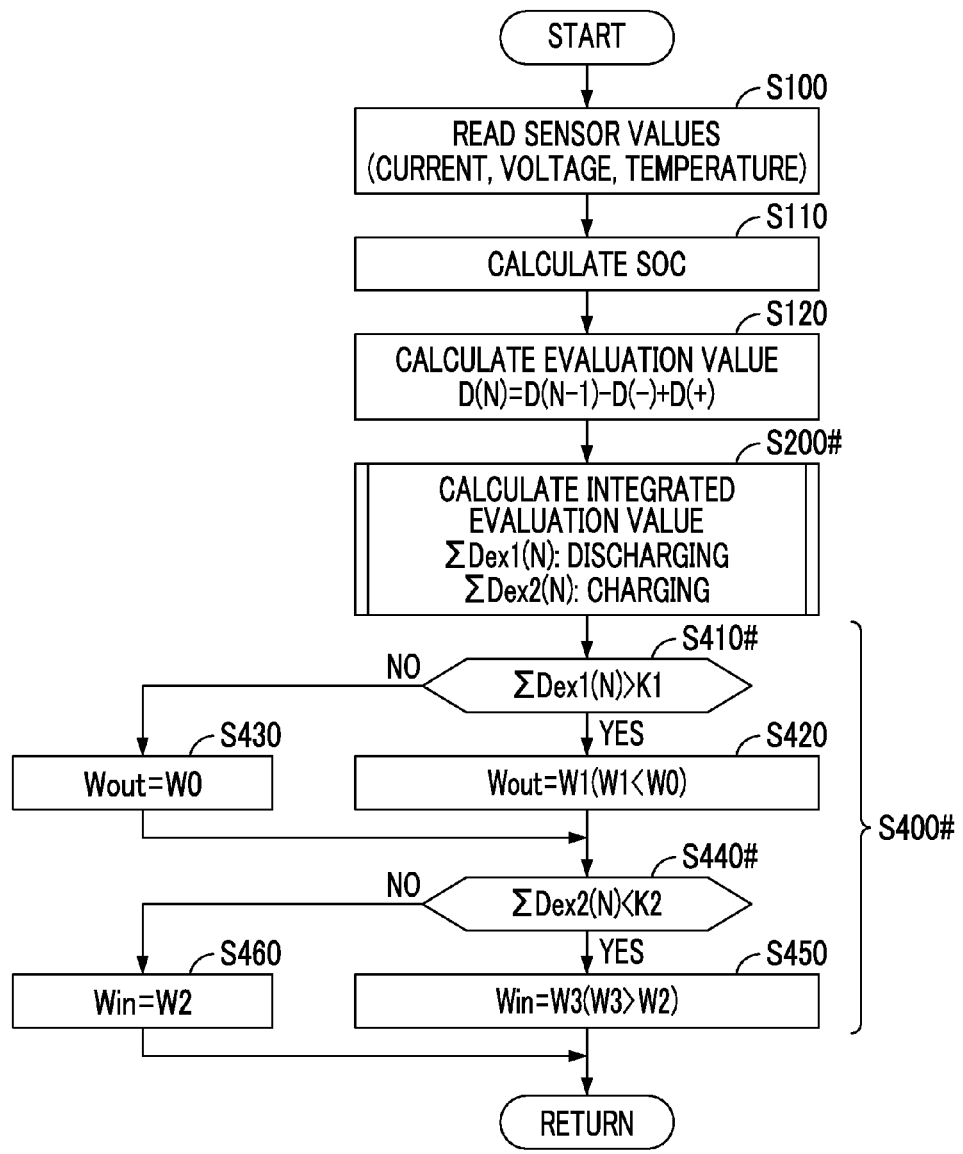
FIG. 9 is a flowchart illustrating control processing in a battery use period for suppressing high rate deterioration in a battery system according to a second embodiment of the present disclosure.

FIG. 9 is a flowchart illustrating control processing in the battery use period for suppressing high rate deterioration in the battery system according to the second embodiment.

Comparing FIG. 9 with FIG. 4, in the second embodiment, Steps S200# and S400# are executed instead of Steps S200 and S400 of FIG. 4. The processing of other steps of FIG. 9 are the same as those in FIG. 4, and thus, detailed description thereof will not be repeated.

In Step S200#, the controller 30 separately calculates the integrated evaluation value $\Sigma Dex1(N)$ on the discharging side and the integrated evaluation value $\Sigma Dex2(N)$ on the charging side based on the evaluation value D(N) determined in Step S120.

Figure 10:
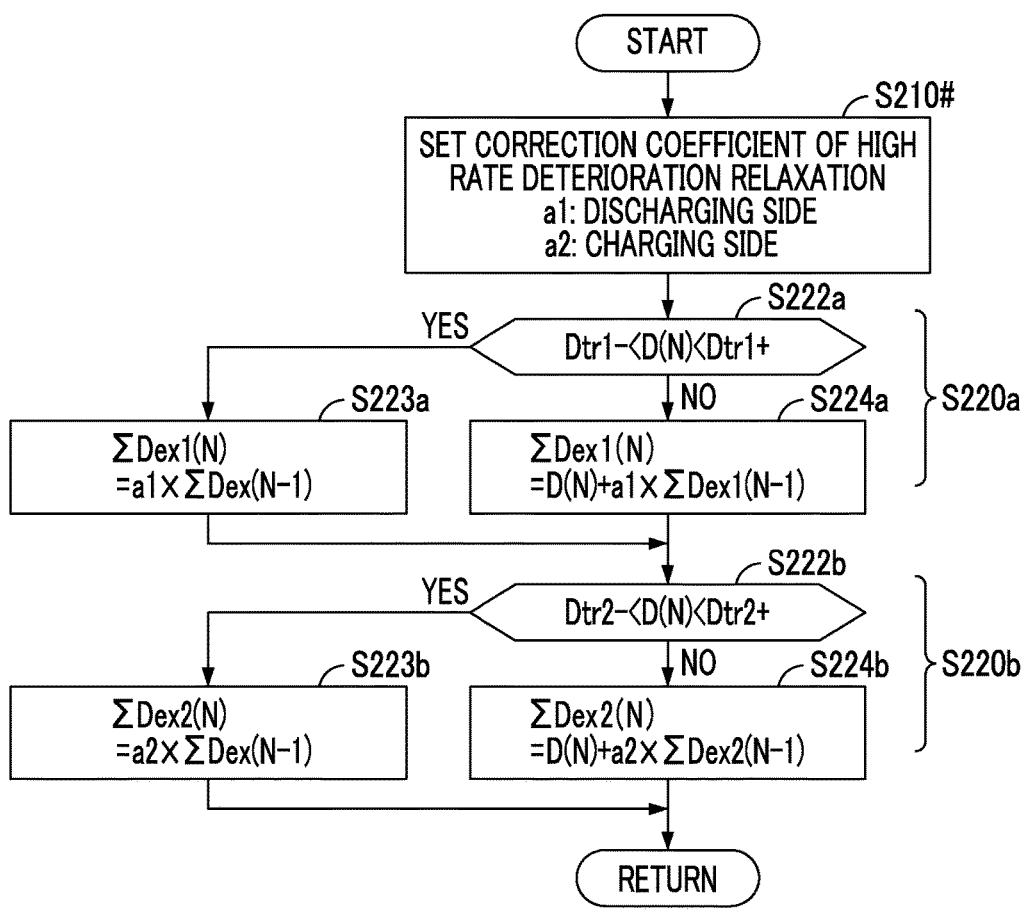
FIG. 10 is a flowchart illustrating the details of calculation processing of integrated evaluation values on a discharging side and a charging side in FIG. 9.

FIG. 10 is a flowchart showing control processing of Step S200# of FIG. 9, that is, the details of calculation processing of the integrated evaluation values on the discharging side and the charging side.

Comparing FIG. 10 with FIG. 5, in the second embodiment, Step S210# is executed instead of Step S210 of FIG. 5. In addition, Steps S220a and S220b are executed instead of S220 of FIG. 5.

In Step S210#, the controller 30 separately sets a relaxation coefficient a1 for use in a calculation expression of the integrated evaluation value $\Sigma Dex1(N)$ on the discharging side and a relaxation coefficient a2 for use in a calculation expression of the integrated evaluation value $\Sigma Dex2(N)$ on the charging side. Similarly to the correction coefficient a in the first embodiment, the relaxation coefficients a1, a2 are set within a range of 0<a1<1.0 and 0<a2<1.0 in order to calculate the degree of relaxation of high rate deterioration each time the cycle time $\Delta t$ elapses. The relaxation coefficient a1 corresponds to a "first relaxation coefficient", and the relaxation coefficient a2 corresponds to a "second relaxation coefficient".

Step S220a includes Steps S222a to S224a for calculating the integrated evaluation value $\Sigma Dex1(N)$ on the discharging side.

In Step S222a, the controller 30 compares the evaluation value D(N) with thresholds Dtr1+, Dtr1− for calculating the integrated evaluation value on the discharging side. The threshold Dtr1+ is set to a positive value (Dtr1+>0), and the threshold Dtr1− is set to a negative value or 0 (Dtr1−≤0). That is, the threshold Dtr1+ corresponds to a "first threshold", and the threshold Dtr1− corresponds to a "second threshold".

When Dtr1−<D(N)<Dtr1+, that is, when the evaluation value D(N) does not exceed the thresholds Dtr1+, Dtr1− (when the determination result in S222a is YES), the controller 30 progresses the process to Step S223b and calculates the integrated evaluation value $\Sigma Dex1(N)$ in the present control cycle according to Expression (7) described below.

$$\Sigma Dex1(N)=a1\times\Sigma Dex1(N-1) \qquad (7)$$

In Step S223a, the evaluation value D(N) is not integrated, and relaxation of high rate deterioration is reflected in the integrated evaluation value according to the relaxation coefficient a1. That is, the integrated evaluation value $\Sigma Dex1(N)$ is updated such that the absolute value thereof decreases, while maintaining the polarity.

In contrast, when D(N)<Dtr1− or D(N)>Dtr1+, that is, when |D(N)|>|Dtr1+| in a case where D(N)>0 or when ÅD(N)|>|Dtr1−| in a case where D(N)<0 (when the determination result in S222a is NO), since the evaluation value D(N) exceeds the thresholds Dtr1+, Dtr1−, the controller 30 progresses the process to Step S224a.

In Step S224a, the integrated evaluation value $\Sigma Dex1(N)$ in the present control cycle is calculated according to Expression (8) described below.

$$\Sigma Dex1(N)=D(N)+a1\times\Sigma Dex1(N-1) \qquad (8)$$

In Expression (8), the evaluation value D(N) exceeding the threshold Dtr1+ or Dtr1− is added to Expression (7). In Expression (8), in regard to the evaluation value D(N), a partial value, for example, a value of only an excess (D(N)−Dtr1+ or D(N)−Dtr1−) with respect to the threshold Dtr1+ or Dtr1− may be added.

Similarly, Step S220b includes Steps S222b to S224b for calculating the integrated evaluation value $\Sigma Dex2(N)$ on the charging side.

In Step S222b, the controller 30 compares the evaluation value D(N) with thresholds Dtr2+, Dtr2− for calculating the integrated evaluation value on the charging side. The threshold Dtr2− is set to a negative value (Dtr2−<0), and the threshold Dtr2+ is set to a positive value or 0 (Dtr2+≥0). That is, the threshold Dtr2− corresponds to a "third threshold", and the threshold Dtr2+ corresponds to a "fourth threshold".

When Dtr2−<D(N)<Dtr2+, that is, when the evaluation value D(N) does not exceed the thresholds Dtr2+, Dtr2− (when the determination result in S222b is YES), the controller 30 progresses the process to Step S223a, and calculates the integrated evaluation value ΣDex2(N) in the present control cycle according to Expression (9) described below.

$$\Sigma Dex2(N) = a2 \times \Sigma Dex2(N-1) \quad (9)$$

In Step S224b, the evaluation value D(N) is not integrated, and relaxation of high rate deterioration is reflected in the integrated evaluation value according to the relaxation coefficient a2. That is, the integrated evaluation value ΣDex2(N) is updated such that the absolute value thereof decreases, while maintaining the polarity.

In contrast, when D(N)<Dtr2− or D(N)>Dtr2+, that is, when |D(N)|>|Dtr2+| in a case where D(N)>0 or when |D(N)|>|Dtr2−| in a case where D(N)<0 (when the determination result in S222b is NO), since the evaluation value D(N) exceeds the thresholds Dtr2+, Dtr2−, the controller 30 progresses the process to Step S224b.

In Step S224b, the integrated evaluation value ΣDex2(N) in the present control cycle is calculated according to Expression (10) described below.

$$\Sigma Dex2(N) = D(N) + a2 \times \Sigma Dex2(N-1) \quad (10)$$

In Expression (10), the evaluation value D(N) exceeding the threshold Dtr2+ or Dtr2− is added to Expression (9). In Expression (10), in regard to the evaluation value D(N), a partial value, for example, a value of only an excess (D(N)−Dtr2+ or D(N)−Dtr2−) with respect to the threshold Dtr2+ or Dtr2− may be added.

In this way, the integrated evaluation value ΣDex1(N) on the discharging side and the integrated evaluation value ΣDex2(N) on the charging side correspond to those when the integrated evaluation value ΣDex(N) in the first embodiment is calculated separately on the charging side and the discharging side. That is, the thresholds for specifying the on/off of integration of the evaluation value D(N) to the integrated evaluation value are separately on the discharging side (Dtr1−, Dtr1+) and the charging side (Dtr2−,Dtr2+). Furthermore, the relaxation coefficients reflecting relaxation of high rate deterioration with time can be set separately on the discharging side (a1) and the charging side (a2).

Referring to FIG. 9 again, in Step S400#, the discharge power upper limit value Wout and the charge power upper limit value Win of the secondary battery 10 are set using the integrated evaluation values ΣDex1(N), ΣDex2(N). Step S400# has Steps S410#, S420, and S430 for discharging restriction and S440#, S450, and S460 for charging restriction.

In Step S410#, the controller 30 compares the integrated evaluation value ΣDex1(N) on the discharging side with the same discharging restriction threshold K1 (K1>0) as in Step S410 of FIG. 4. Then, when ΣDex1(N) ≤K1, that is, when the integrated evaluation value ΣDex1(N) does not reach the discharging restriction threshold K1 (when the determination result in S410# is NO), the controller 30 progresses to Step S430 the same as in FIG. 4. When ΣDex1(N)>K1, that is, when |ΣDex1(N)|>|K1| in a case where ΣDex1(N) is a positive value (when the determination result in S410# is YES), since the integrated evaluation value ΣDex1(N) exceeds the discharging restriction threshold K1, the controller 30 progresses the process to Step S420 the same as in FIG. 4. As described above, in Step S420, the discharge power upper limit value Wout is set to be smaller than that in Step S430, whereby discharging from the secondary battery 10 is restricted.

Similarly, in Step S440#, the controller 30 compares the integrated evaluation value ΣDex2(N) on the charging side with the same charging restriction threshold K2 (K2<0) as in Step S410 of FIG. 4. Then, when ΣDex2(N)≥K2, that is, when the integrated evaluation value ΣDex2(N) does not reach the charging restriction threshold K2 (when the determination result in S440# is NO), the controller 30 progresses the process to Step S460 the same as in FIG. 4. When ΣDex2(N)<K2, that is, when |ΣDex2(N)|>|K2| in a case where ΣDex2(N) is a negative value (when the determination result in S440# is YES), since the integrated evaluation value ΣDex2(N) exceeds the charging restriction threshold K2, the controller 30 progresses the process to Step S450 the same as in FIG. 4. As described above, in Step S450, the discharge power upper limit value Win is set to be greater than in Step S430 (that is, the absolute value thereof is smaller), whereby charging to the secondary battery 10 is restricted.

In this way, in the battery system for an electric vehicle according to the second embodiment, a need for discharging restriction is managed according to the integrated evaluation value ΣDex1(N) on the discharging side, and a need for charging restriction is managed according to the integrated evaluation value ΣDex2(N) on the charging side. Accordingly, the correction processing for reflecting the recovery behavior of high rate deterioration in the battery deactivation period is performed separately with the integrated evaluation values ΣDex1(N), ΣDex2(N).

Figure 11:
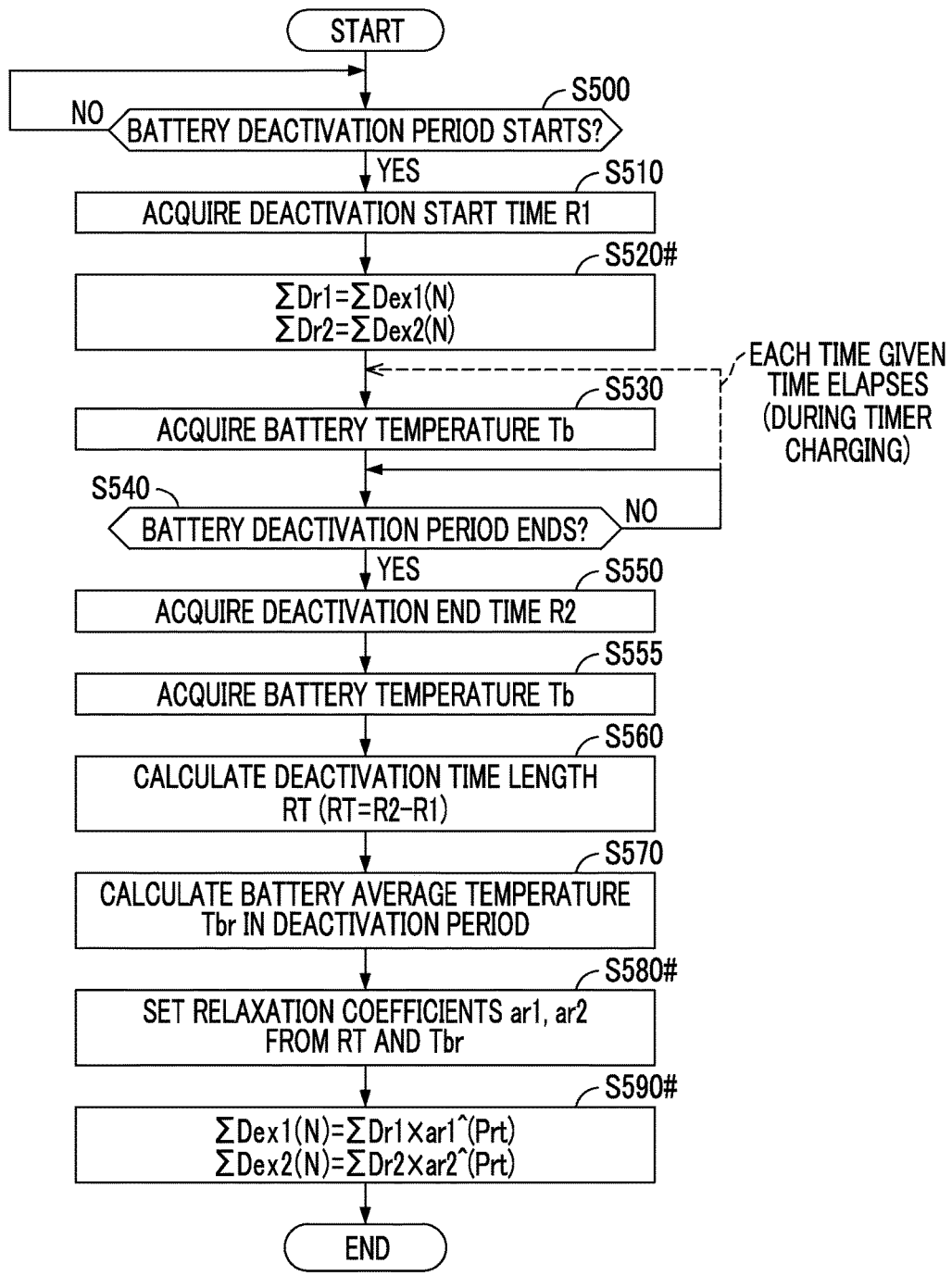
FIG. 11 is a flowchart illustrating correction processing of the integrated evaluation values in a battery deactivation period of the battery system for an electric vehicle according to the second embodiment.

FIG. 11 is a flowchart illustrating correction processing of an integrated evaluation value in the battery deactivation period in the battery system for an electric vehicle according to the second embodiment.

Comparing FIG. 11 with FIG. 6, in the second embodiment, Step S520#, S580#, and S590# are executed instead of Steps S520, S580, and S590 in the control processing of FIG. 6. The processing of other steps of FIG. 11 are the same as those in FIG. 6, and thus, detailed description thereof will not be repeated.

The controller 30 acquires the deactivation start time R1 at the start of the battery deactivation period (S510), and in Step S520#, respectively stores the integrated evaluation value ΣDex1(N) on the discharging side and the integrated evaluation value ΣDex2(N) on the charging side as initial values ΣDr1, ΣDr2 of the integrated evaluation values in the battery deactivation period.

Then, at the end of the battery deactivation period (when the determination result in S540 is YES), as in the first embodiment, the deactivation time length RT (S560) and the battery average temperature Tbr in the battery deactivation period (S570) are calculated.

In Step S580#, the controller 30 sets relaxation coefficients ar1, ar2 in the battery deactivation period. The relaxation coefficient ar1 is used for correction processing of the integrated evaluation value ΣDex1(N) on the discharging side, and the relaxation coefficient ar2 is used for correction processing of the integrated evaluation value ΣDex2(N) on the charging side. Similarly to the relaxation coefficient ar of the first embodiment, the relaxation coefficients ar1, ar2 are respectively set variably according to the deactivation time length RT, or according to the deactivation time length RT and the battery average temperature Tbr.

For example, a map according to the characteristics shown in FIG. 8 is created in advance for each of the relaxation coefficients ar1, ar2, whereby the relaxation coefficients ar1, ar2 can be set in Step S580#. The relaxation coefficient ar1 corresponds to a "first deactivation relaxation coefficient", and the relaxation coefficient ar2 corresponds to a "second deactivation relaxation coefficient". In this way, the relaxation coefficients a1, ar1 are set separately, and the relaxation coefficients a2, ar2 are set separately.

In Step S590#, the controller 30 executes correction processing of integrated evaluation values $\Sigma Dex1(N)$, $\Sigma Dex2(N)$ according to Expressions (11) and (12) using the relaxation coefficients ar1, ar2 determined in Step S580#.

$$\Sigma Dex1(N) = \Sigma Dr1 \times ar1^{Prt} \quad (11)$$

$$\Sigma Dex2(N) = \Sigma Dr2 \times ar2^{Prt} \quad (12)$$

Expressions (11) and (12) correspond to those when Expression (6) of the first embodiment is created separately with the integrated evaluation values $\Sigma Dex1(N)$, $\Sigma Dex2(N)$.

With this, for reflection of the decrease (that is, recovery of high rate deterioration) in resistance increase rate in the battery deactivation period, it is possible to perform the correction processing separately with the integrated evaluation value $\Sigma Dex1(N)$ on the discharging side and the integrated evaluation value $\Sigma Dex2(N)$ on the charging side.

The integrated evaluation values $\Sigma Dex1(N)$, $\Sigma Dex2(N)$ after the correction processing calculated in Step S590# are used as the initial values of the integrated evaluation values $\Sigma Dex1(N)$, $\Sigma Dex2(N)$ in the new battery use period started with the end of the battery deactivation period. Then, in the battery use period, discharging management based on the integrated evaluation value $\Sigma Dex1(N)$ and charging management based on the integrated evaluation value $\Sigma Dex2(N)$ are executed continuously according to the processing shown in FIGS. 9 and 10.

Figure 12:
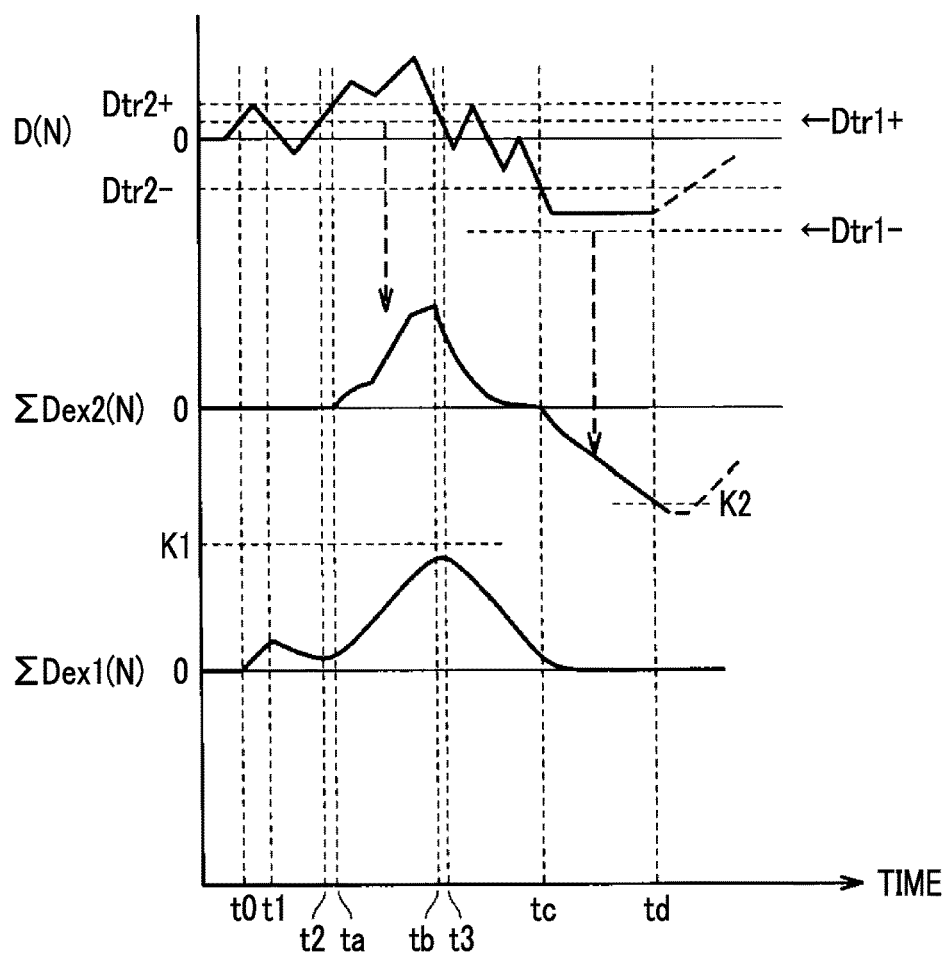
FIG. 12 is a waveform chart showing a transition example of the integrated evaluation values in the battery system for an electric vehicle according to the second embodiment.

FIG. 12 is a waveform chart illustrating a transition example of an integrated evaluation value in the battery system for an electric vehicle according to the second embodiment. In FIG. 12, a waveform chart in the battery use period is shown.

Referring to FIG. 12, the evaluation value D(N) is calculated sequentially at each cycle time $\Delta t$ based on the current value I detected by the current sensor 15 according to a history of a current charging and discharging the secondary battery 10. An initial value of the evaluation value D(N) is 0, and in this state, there is no deviation of the ion concentration.

In contrast, as shown in Expressions (1) to (3), if the secondary battery 10 is discharged, the ion concentration is deviated toward the discharging side, whereby the evaluation value D(N) is driven in a positive direction (plus side). On the contrary, if the secondary battery 10 is charged, the evaluation value D(N) is driven in a negative direction (minus side).

Then, the integrated evaluation value $\Sigma Dex1(N)$ on the discharging side and the integrated evaluation value $\Sigma Dex2(N)$ on the charging side are calculated separately from the common evaluation value D(N) according to the separate thresholds Dtr1+, Dtr1− (discharging side) and Dtr2+, Dtr2− (charging side).

In a period during which D(N)>Dtr2+ or D(N)<Dtr2−, the integrated evaluation value $\Sigma Dex2(N)$ on the charging side is driven toward the discharging side or the charging side by adding D(N) at this time. In a period during which Dtr2−≤D(N)≤Dtr2+, the absolute value of the integrated evaluation value $\Sigma Dex2(N)$ decreases according to the relaxation coefficient a2.

Accordingly, in FIG. 12, in a period until the time ta at which Dtr2−≤D(N)≤Dtr2+, the integrated evaluation value $\Sigma Dex2(N)$ is maintained to be 0. Then, in a period of the times ta to tb at which D(N)>Dtr2+, the integrated evaluation value $\Sigma Dex2(N)$ changes such that the absolute value thereof increases in the positive direction. In a period of the times tb to tc at which Dtr2−≤D(N)≤Dtr2+, the integrated evaluation value $\Sigma Dex2(N)$ changes such that the absolute value thereof decreases and gradually becomes close to 0.

Then, after the time tc at which D(N)<Dtr2−, the integrated evaluation value $\Sigma Dex2(N)$ changes such that the absolute value thereof increases in the negative direction. Then, at the time td, if $\Sigma Dex2(N)$ reaches the charging restriction threshold K2, after the time td, the charge power upper limit value Win of the secondary battery 10 is restricted (S450 of FIG. 9). As a result, during vehicle traveling, a generated power of regenerative braking by the motor generator 25 is restricted according to the charge power upper limit value Win. During external charging, an output power from the charger 28 is restricted according to the charge power upper limit value Win.

With this, as indicated by dotted lines in FIG. 12, the evaluation value D(N) and the integrated evaluation value $\Sigma Dex2(N)$ change to become close to 0, whereby it is possible to avoid an increase in deviation of the ion concentration to the charging side.

In calculating the integrated evaluation value $\Sigma Dex1(N)$ on the discharging side, the thresholds Dtr1+, Dtr1− on the discharging side are set, for example, so as to be shifted toward the minus side with respect to the thresholds Dtr2+, Dtr2− on the charging side. As a result, for the common evaluation value D(N), the integrated evaluation value $\Sigma Dex1(N)$ on the discharging side has a value different from the integrated evaluation value $\Sigma Dex2(N)$ on the charging side.

Specifically, in the periods of the times t0 to t1 and the times t2 to t3 at which the evaluation value D(N)>Dtr1+, the integrated evaluation value $\Sigma Dex1(N)$ changes such that the absolute value thereof increases in the positive direction. In the period until the time t0, the integrated evaluation value $\Sigma Dex1(N)$ is maintained to be 0. In the period of the times t1 to t2 and after the time t3, the integrated evaluation value $\Sigma Dex1(N)$ changes such that the absolute value thereof decreases and gradually becomes close to 0. In the example of FIG. 12, since the integrated evaluation value $\Sigma Dex1(N)$ <K1, the restriction of the discharge power upper limit value Wout is not started.

In this way, in the second embodiment, the integrated evaluation values $\Sigma Dex1(N)$, $\Sigma Dex2(N)$ are calculated separately on the charging side and the discharging side, and are compared with the discharging restriction threshold K1 and the charging restriction threshold K2, whereby charge power restriction and discharge power restriction can be executed.

In FIG. 12, for simplification of notation, while the initial values of the integrated evaluation values $\Sigma Dex1(N)$, $\Sigma Dex2(N)$ are set to 0 (that is, a state where deviation of the ion concentration is eliminated), this corresponds to a behavior when the battery deactivation period is secured for a sufficiently long time. As in this embodiment, the correction processing for reflecting the recovery behavior of high rate deterioration in the battery deactivation period is performed using the relaxation coefficients ar1, ar2, whereby it is possible to appropriately execute charging/discharging restriction in the vehicle operation state based on the integrated evaluation values $\Sigma Dex1(N)$, $\Sigma Dex2(N)$ even if the battery deactivation period is comparatively short and changes according to the situation.

Since the thresholds Dtr1+, Dtr1− (discharging side) and Dtr2+, Dtr2− (charging side) and the relaxation coefficients a1, a2 have different proper values according to the composition or structure of the secondary battery, it is preferable that the thresholds and the relaxation coefficients are adjusted in conformity with the characteristics of the secondary battery 10 being applied based on results of practical experiments or the like. It is described for confirmation that there may occur a case where the level relationship between the thresholds Dtr1+, Dtr2+ and/or the level relationship between the thresholds Dtr1−, Dtr2− are different from those in the example of FIG. 12 according to the characteristics of the secondary battery.

As described above, the relaxation coefficients a1, a2 may have the same value according to the characteristics of the secondary battery. Similarly, only one of the thresholds Dtr1+, Dtr2+ and the thresholds Dtr1−, Dtr2− may have the same value.

Next, the correspondence relationship between the integrated evaluation values on the charging side and the discharging side and a practical battery behavior will be described referring to FIGS. 13 to 15.

Figure 13:
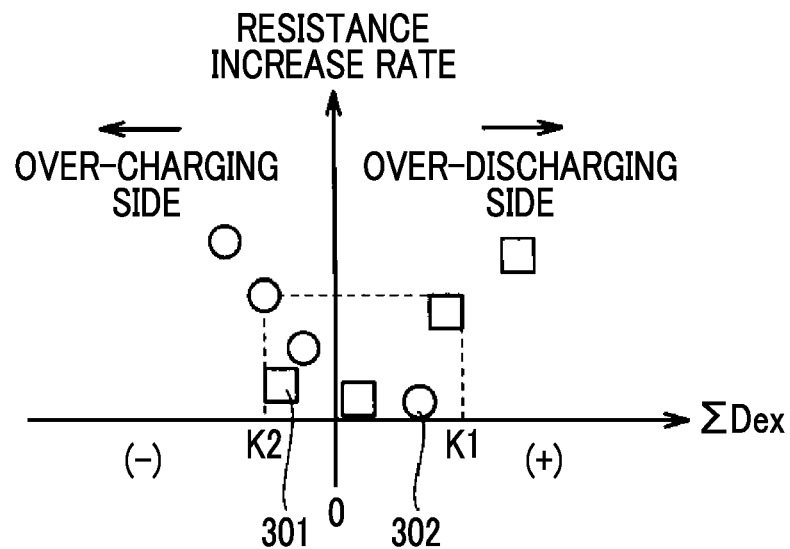
FIG. 13 is a conceptual diagram illustrating an example of an analysis result in a case where charging/discharging is managed using a common integrated evaluation value for a nonaqueous secondary battery mounted in an externally chargeable electric vehicle according to the second embodiment.

FIG. 13 shows an example of an analysis result when both of over-charging and over-discharging are managed with a common integrated evaluation value $\Sigma Dex(N)$ as in JP 2014-3826 A in a nonaqueous secondary battery mounted in an externally chargeable electric vehicle.

Referring to FIG. 13, the horizontal axis of FIG. 13 indicates a calculation result of the integrated evaluation value $\Sigma Dex(N)$ according to JP 2014-3826 A, and the vertical axis indicates a resistance increase rate obtained from an analysis result of the secondary battery.

In FIG. 13, a combination of an integrated evaluation value $\Sigma Dex$ corresponding to a final value of the integrated evaluation value $\Sigma Dex(N)$ and a practical resistance increase rate is plotted. In addition, for each plot point, an analysis result regarding whether practical deviation of the ion concentration of the secondary battery is an over-discharging side or an over-charging side is indicated by symbol (○, □) as well. Specifically, an plot point of being over-discharged is denoted by "□", and a plot point tending to be over-charged is denoted by "○".

As will be understood from FIG. 13, in the method of managing over-charging and over-discharging with the common integrated evaluation value $\Sigma Dex$, it can be understood that there are a plot point 301 where the integrated evaluation value $\Sigma Dex$ is a negative value, but the ion concentration is deviated toward the over-discharging side practically, and on the contrary, a plot point 302 where the integrated evaluation value $\Sigma Dex$ is a positive value, but the ion concentration is deviated toward the over-charging side practically.

In JP 2014-3826 A, in calculating the integrated evaluation value $\Sigma Dex(N)$, when the evaluation value D(N) exceeds the thresholds Dtr+, Dtr−, integration processing is executed. Accordingly, with the adjustment of the thresholds Dtr+, Dtr−, all plot points can be shifted to the over-discharging side (the right side in FIG. 13) or the over-charging side (the left side in FIG. 13). However, in this method, the plot points 301, 302 cannot be respectively evaluated correctly on the over-discharging side and the over-charging side. In this way, in regard to a nonaqueous secondary battery which is used including a mode of being continuously charged for a long time by external charging, the knowledge that it is difficult to manage both of over-charging and over-discharging using the common integrated evaluation value as in JP 2014-3826 A is obtained from the inventors.

Figure 14:
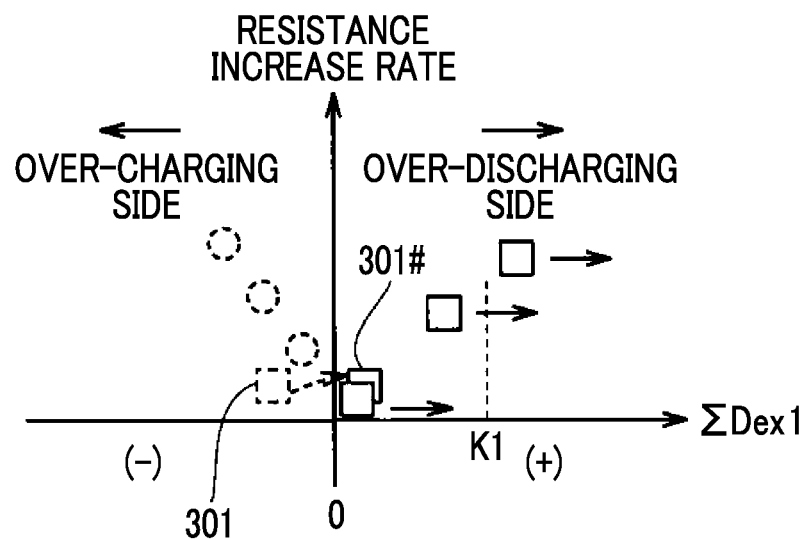
FIG. 14 is a conceptual diagram illustrating a setting method of a threshold for use in calculation of the integrated evaluation value on the discharging side in the battery system for an electric vehicle according to the second embodiment.

FIG. 14 shows an example of a setting method of the thresholds in calculating the integrated evaluation value $\Sigma Dex1$ on the discharging side. The horizontal axis of FIG. 14 indicates an integrated evaluation value $\Sigma Dex1$ corresponding to a final value of the integrated evaluation value $\Sigma Dex1(N)$, and the vertical axis of FIG. 14 indicates a practical resistance increase rate of the secondary battery as in FIG. 13.

Referring to FIG. 14, in calculating the integrated evaluation value $\Sigma Dex1(N)$ on the discharging side, the thresholds Dtr1+, Dtr1− can be tuned such that the plot point 301 in FIG. 13 is included in a region (plot point 301#) of $\Sigma Dex1>0$. If tuning is performed in this way, compared to FIG. 6, the integrated evaluation value $\Sigma Dex1$ in a case of over-discharging may be shifted to the right side (plus side), but the discharging restriction threshold K1 is appropriately set, whereby it is possible to avoid a decrease in use efficiency of the secondary battery 10 due to excessive discharging restriction. Furthermore, since the integrated evaluation value $\Sigma Dex2$ for managing over-charging is calculated separately, management on the over-charging side is not excessively relaxed.

Figure 15:
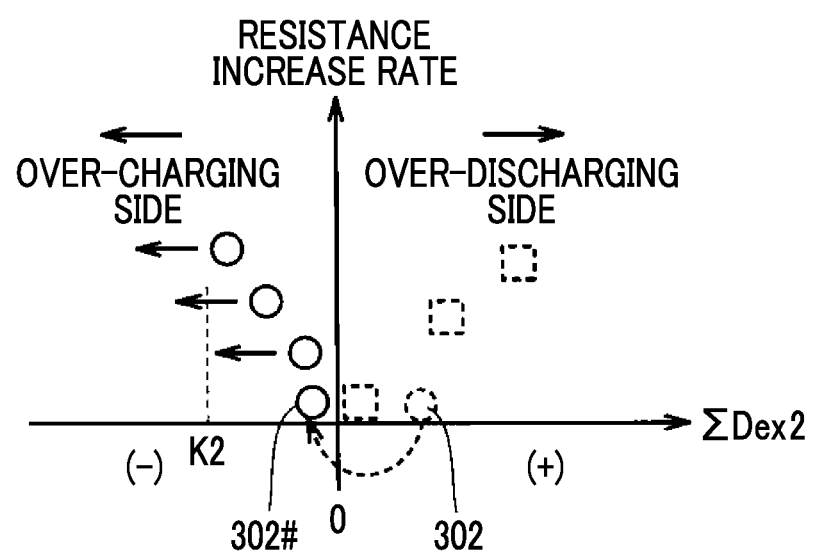
FIG. 15 is a conceptual diagram illustrating a setting method of a threshold for use in calculation of the integrated evaluation value on the charging side in the battery system for an electric vehicle according to the second embodiment.

FIG. 15 shows an example of a setting method of the thresholds in calculating the integrated evaluation value $\Sigma Dex2$ on the charging side. The horizontal axis of FIG. 15 indicates an integrated evaluation value $\Sigma Dex2$ corresponding to a final value of the integrated evaluation value $\Sigma Dex2(N)$, and the vertical axis of FIG. 15 indicates a practical resistance increase rate of the secondary battery as in FIG. 13.

Referring to FIG. 15, in regard to the integrated evaluation value $\Sigma Dex2(N)$ on the charging side, the thresholds Dtr2+, Dtr2− are turned such that the plot point 302 in FIG. 13 is included in a region (plot point 302#) of $\Sigma Dex2<0$. If tuning is performed in this way, compared to FIG. 13, the integrated evaluation value $\Sigma Dex2$ in a case of over-charging may be shifted to the left side (minus side), but the charging restriction threshold K2 is appropriately set, whereby it is possible to avoid excessive charging restriction of the secondary battery 10. Furthermore, since the integrated evaluation value $\Sigma Dex1$ for managing over-discharging is calculated separately, management on the over-discharging side is not excessively relaxed.

In this way, in the battery system for an electric vehicle according to the second embodiment, in the battery use period, discharging restriction and charging restriction are executed separately using the integrated evaluation value $\Sigma Dex1(N)$ on the discharging side and the integrated evaluation value $\Sigma Dex2(N)$ on the charging side integrated separately while setting the separate thresholds Dtr1+, Dtr1− (discharging side) and Dtr2+, Dtr2− (charging side). In addition, in the battery deactivation period, the relaxation coefficients ar1, ar2 are set separately from the relaxation coefficients a1, a2, whereby it is possible to appropriately execute the correction processing reflecting the recovery behavior of high rate deterioration for the integrated evaluation value $\Sigma Dex1(N)$ and the integrated evaluation value $\Sigma Dex2(N)$. The relaxation coefficients a1, a2 may have the same value according to the characteristics of the secondary battery 10.

In this way, according to the battery system for an electric vehicle according to the second embodiment, for a nonaqueous secondary battery to which external charging is applied, it is possible to appropriately prevent high rate deterioration while further coping with both of charging/discharging during vehicle traveling and external charging since the recovery behavior of deviation of the ion concentration in the charging/discharging deactivation period is reflected.

In the first and second embodiments, the configuration of the electric vehicle 100 or 100# shown in FIG. 1 is just an example, the present disclosure can be applied to an electric vehicle having a drive system different from the illustration of FIGS. 1 and 9. That is, the present disclosure can be commonly applied to an electric vehicle in which a nonaqueous secondary battery having a nonaqueous electrolyte is used as a vehicle drive power supply.

In this embodiment, although an example where the same integrated evaluation value ΣDex(N) as in WO 2013/046263 and JP 2014-3826 A or the integrated evaluation values ΣDex1(N), ΣDex2(N) calculated separately for discharging and charging are used as a "deterioration index value" for evaluating a deterioration component degrading the input/output performance of the secondary battery 10 due to high rate deterioration, the application of the present disclosure is not limited thereto. That is, the correction processing (FIGS. 6 and 11) in the battery deactivation period described in this embodiment may be applied to a "deterioration evaluation value" calculated by an arbitrary method in the battery use period, thereby calculating the deterioration evaluation value at the end of the battery deactivation period (that is, at the start of the new battery use period).

It should be considered that the embodiments disclosed herein are merely exemplary in all aspects, and not restrictive. The scope of the present disclosure is defined by the appended claims, not the above description, and is intended to include all changes or modifications within the range of the claims and equivalents thereof.

What is claimed is:

1. A battery system for an electric vehicle, the electric vehicle mounting an electric motor configured to generate any one of a braking force of the electric vehicle and a drive force of the electric vehicle, the battery system comprising:
    a secondary battery including a nonaqueous electrolyte, the secondary battery being configured to generate any one of the braking force of the electric vehicle and the drive force of the electric vehicle by transmitting and receiving electric power to and from the electric motor;
    a charger configured to charge the secondary battery by a power supply outside the electric vehicle;
    an electronic control unit configured to:
    (i) control charging and discharging of the secondary battery,
    (ii) calculate a deterioration index value based on a history of a current of the secondary battery in a use period of the secondary battery, the deterioration index value being a value for evaluating a deterioration component which degrades the input and output performance of the secondary battery according to deviation of an ion concentration in the nonaqueous electrolyte by charging and discharging of the secondary battery,
    (iii) restrict any one of the discharge power and the charge power of the secondary battery when the deterioration index value exceeds a predetermined restriction threshold,
    (iv) correct the deterioration index value at the end of a deactivation period according to deactivation relaxation coefficient at the end of the deactivation period during which the charging and discharging of the secondary battery is deactivated, the deactivation relaxation coefficient being a coefficient indicating the degree of relaxation of deviation of the ion concentration each time a given time elapses in the deactivation period,
    (v) set the deactivation relaxation coefficient variably based on at least a time length of the deactivation period, and
    (vi) set the deactivation relaxation coefficient such that, when the time length is short, the degree of relaxation of deviation of the ion concentration for the given time becomes greater than the degree of relaxation of deviation of the ion concentration when the time length is long.

2. The battery system according to claim 1, wherein the electronic control unit is configured to:
    (i) set the deactivation relaxation coefficient variably based on the time length and a temperature of the secondary battery in the deactivation period, and
    (ii) set the deactivation relaxation coefficient such that, when the temperature is high, the degree of relaxation of deviation of the ion concentration for the given time becomes greater than the degree of relaxation of deviation of the ion concentration when the temperature is low.

3. The battery system according to claim 2, wherein the electronic control unit is configured to:
    set deactivation relaxation coefficient such that a difference is smaller as the time length is longer, the difference being a value of a difference between set values of the deactivation relaxation coefficient caused by a difference in temperature of the secondary battery.

4. The battery system according to claim 2, wherein the electronic control unit is configured to:
    (i) acquire the temperature at the start of the deactivation period when a charging schedule designating a charging start time of the secondary battery by the charger in the deactivation period is established in advance, and
    (ii) further acquire the temperature multiple times until the charging start time according to the charging schedule to determine the temperature of the secondary battery for setting the deactivation relaxation coefficient.

5. The battery system according to claim 1, wherein the electronic control unit is configured to:
    (i) calculate an evaluation value of the deterioration component based on a history of a current of the secondary battery in the use period,
    (ii) calculate a value including a value of a first polarity as the evaluation value when a distribution of the ion concentration is deviated toward a discharging side,
    (iii) calculate a value including a second polarity opposite to the first polarity as the evaluation value when the distribution of the ion concentration is deviated toward a charging side,
    (iv) separately calculate a first integrated evaluation value and a second integrated evaluation value as the deterioration index value, the first integrated evaluation value being a value on the discharging side obtained by integrating the evaluation value exceeding any one of a first threshold and a second threshold set in advance, the second integrated evaluation value is a value on the charging side obtained by integrating the evaluation value exceeding any one of a third threshold and a fourth threshold set in advance, the first threshold being set to a value including the first polarity, the second threshold being set to any one of 0 and a value including the second polarity, the third threshold being set to a value including the second polarity, and the fourth threshold being set to any one of 0 and a value including the first polarity, (v) set the deactivation relaxation coefficient as a coefficient including a first deactivation relaxation coefficient for correcting the first integrated evaluation value and a second deactivation relaxation coefficient for correcting the second integrated evaluation value, (vi) calculate the first integrated evaluation value by adding a past value of the first integrated evaluation value to a current value of the evaluation value, an absolute value of the past value of the first integrated evaluation value decreasing by the first relaxation coefficient set separately from the first deactivation relaxation coefficient with time in the use period, and the current value corresponding to any one of a part and a whole of the current evaluation value when the current evaluation value includes the first polarity and the absolute value of the current evaluation value is greater than the first threshold, (vii) calculate the second integrated evaluation value by adding a past value of the second integrated evaluation value to a current value of the evaluation value, an absolute value of the past value of the second integrated evaluation value decreasing by a second relaxation coefficient set separately from the second deactivation relaxation coefficient with time in the use period, and the current value corresponding to any one of the part and the whole of the current evaluation value when the current evaluation value includes the second polarity and the absolute value of the current evaluation value is greater than the third threshold, (viii) set a value including a discharging restriction threshold including the first polarity and a charging restriction threshold including the second polarity as the restriction threshold, (ix) restrict the discharge power of the secondary battery when the absolute value of the first integrated evaluation value is greater than the discharging restriction threshold when the first integrated evaluation value includes the first polarity, and (x) restrict the charge power of the secondary battery when the absolute value of the second integrated evaluation value is greater than the charging restriction threshold when the second integrated evaluation value includes the second polarity.

6. The battery system according to claim 1,
wherein the electronic control unit is configured to:
(i) calculate an evaluation value of the deterioration component based on a history of a current of the secondary battery in the use period,
(ii) calculate a value including a value of a first polarity as the evaluation value when a distribution of the ion concentration is deviated toward a discharging side,
(iii) calculate a value including a second polarity opposite to the first polarity as the evaluation value when the distribution of the ion concentration is deviated toward a charging side,
(iv) separately calculate a first integrated evaluation value and a second integrated evaluation value as the deterioration index value, the first integrated evaluation value being a value on a discharging side obtained by integrating the evaluation value exceeding any one of a first threshold and a second threshold set in advance, the second integrated evaluation value being a value on a charging side obtained by integrating the evaluation value exceeding any one of a third threshold and a fourth threshold set in advance, the first threshold being set to a value including the first polarity, the second threshold being set to any one of 0 and a value including the second polarity, the third threshold being set to a value including the second polarity, and the fourth threshold being set to 0 or a value including the first polarity, (v) set the deactivation relaxation coefficient as a coefficient including a first deactivation relaxation coefficient for correcting the first integrated evaluation value and a second deactivation relaxation coefficient for correcting the second integrated evaluation value, (vi) calculate the first integrated evaluation value by adding a past value of the first integrated evaluation value to a current value of the evaluation value, an absolute value of the past value of the first integrated evaluation value decreasing by the first relaxation coefficient set separately from the first deactivation relaxation coefficient with time in the use period, and the current value corresponding to any one of a part and a whole of the current evaluation value when the current evaluation value includes the first polarity and the absolute value of the current evaluation value is greater than the first threshold, (vii) calculate the second integrated evaluation value by adding a past value of the second integrated evaluation value to a current value of the evaluation value, an absolute value of the past value of the second integrated evaluation value decreasing by a second relaxation coefficient set separately from the second deactivation relaxation coefficient with time in the use period, and the current value corresponding to any one of the part and the whole of the current evaluation value when the current evaluation value includes the first polarity and the absolute value of the current evaluation value is greater than the fourth threshold, (viii) set a value including a discharging restriction threshold including the first polarity and a charging restriction threshold including the second polarity as the restriction threshold, (ix) restrict the discharge power of the secondary battery when the absolute value of the first integrated evaluation value is greater than the discharging restriction threshold in a case where the first integrated evaluation value includes the first polarity, and (x) restrict the charge power of the secondary battery when the absolute value of the second integrated evaluation value is greater than the charging restriction threshold in a case where the second integrated evaluation value includes the second polarity.

7. The battery system according to claim 1,
wherein the electronic control unit is configured to:
(i) calculate an evaluation value of the deterioration component based on a history of a current of the secondary battery in the use period,
(ii) calculate a value including a value of a first polarity as the evaluation value when a distribution of the ion concentration is deviated toward a discharging side,
(iii) calculate a value including a second polarity opposite to the first polarity as the evaluation value when the distribution of the ion concentration is deviated toward a charging side,
(iv) separately calculate a first integrated evaluation value and a second integrated evaluation value as the deterioration index value, the first integrated evaluation value being a value on the discharging side obtained by integrating the evaluation value exceeding any one of a first threshold and a second threshold set in advance, the second integrated evaluation value is a value on the charging side obtained by integrating the evaluation value exceeding any one of a third threshold and a fourth threshold set in advance, the first threshold being set to a value including the first polarity, the second threshold being set to any one of 0 and a value including the second polarity, the third threshold being set to a value including the second polarity, and the fourth threshold being set to any one of 0 and a value including the first polarity, (v) set the deactivation relaxation coefficient as a coefficient including a first deactivation relaxation coefficient for correcting the first integrated evaluation value and a second deactivation relaxation coefficient for correcting the second integrated evaluation value, (vi) calculate the first integrated evaluation value by adding a past value of the first integrated evaluation value to a current value of the evaluation value, an absolute value of the past value of the first integrated evaluation value decreasing by the first relaxation coefficient set separately from the first deactivation relaxation coefficient with time in the use period, and the current value corresponding to any one of a part and a whole of the current evaluation value when the current evaluation value includes the second polarity and the absolute value of the current evaluation value is greater than the second threshold, (vii) calculate the second integrated evaluation value by adding a past value of the second integrated evaluation value to a current value of the evaluation value, an absolute value of the past value of the second integrated evaluation value decreasing by a second relaxation coefficient set separately from the second deactivation relaxation coefficient with time in the use period, and the current value corresponding to any one of the part and the whole of the current evaluation value when the current evaluation value includes the second polarity and the absolute value of the current evaluation value is greater than the third threshold, (viii) set a value including a discharging restriction threshold including the first polarity and a charging restriction threshold including the second polarity as the restriction threshold, (ix) restrict the discharge power of the secondary battery when the absolute value of the first integrated evaluation value is greater than the discharging restriction threshold in a case where the first integrated evaluation value includes the first polarity, and (x) restrict the charge power of the secondary battery when the absolute value of the second integrated evaluation value is greater than the charging restriction threshold in a case where the second integrated evaluation value includes the second polarity.

8. The battery system according to claim 1, wherein the electronic control unit is configured to:

(i) calculate an evaluation value of the deterioration component based on a history of a current of the secondary battery in the use period, (ii) calculate a value including a value of a first polarity as the evaluation value when a distribution of the ion concentration is deviated toward a discharging side, (iii) calculate a value including a second polarity opposite to the first polarity as the evaluation value when the distribution of the ion concentration is deviated toward a charging side, (iv) separately calculate a first integrated evaluation value and a second integrated evaluation value as the deterioration index value, the first integrated evaluation value being a value on a discharging side obtained by integrating the evaluation value exceeding any one of a first threshold and a second threshold set in advance, the second integrated evaluation value being a value on a charging side obtained by integrating the evaluation value exceeding any one of a third threshold and a fourth threshold set in advance, the first threshold being set to a value including the first polarity, the second threshold being set to any one of 0 and a value including the second polarity, the third threshold being set to a value including the second polarity, and the fourth threshold being set to any one of 0 and a value including the first polarity, (v) set the deactivation relaxation coefficient as a coefficient including a first deactivation relaxation coefficient for correcting the first integrated evaluation value and a second deactivation relaxation coefficient for correcting the second integrated evaluation value, (vi) calculate the first integrated evaluation value by adding a past value of the first integrated evaluation value to a current value of the evaluation value, an absolute value of the past value of the first integrated evaluation value decreasing by the first relaxation coefficient set separately from the first deactivation relaxation coefficient with time in the use period, and the current value corresponding to any one of a part and a whole of the current evaluation value when the current evaluation value includes the second polarity and the absolute value of the current evaluation value is greater than the second threshold, (vii) calculate the second integrated evaluation value by adding a past value of the second integrated evaluation value to a current value of the evaluation value, an absolute value of the past value of the second integrated evaluation value decreasing by a second relaxation coefficient set separately from the second deactivation relaxation coefficient with time in the use period, and the current value corresponding to any one of the part and the whole of the current evaluation value when the current evaluation value includes the first polarity and the absolute value of the current evaluation value is greater than the fourth threshold, (viii) set a value including a discharging restriction threshold including the first polarity and a charging restriction threshold including the second polarity as the restriction threshold, (ix) restrict the discharge power of the secondary battery when the absolute value of the first integrated evaluation value is greater than the discharging restriction threshold in a case where the first integrated evaluation value includes the first polarity, and (x) restrict the charge power of the secondary battery when the absolute value of the second integrated evaluation value is greater than the charging restriction threshold in a case where the second integrated evaluation value includes the second polarity.

* * * * *